(12) United States Patent
Taylor et al.

(10) Patent No.: US 7,901,617 B2
(45) Date of Patent: Mar. 8, 2011

(54) HEAT EXCHANGER

(75) Inventors: Mark P. Taylor, Auckland (NZ); John J J Chen, Auckland (NZ); Mohamed Farid, Auckland (NZ); Robert John Wallace, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 872 days.

(21) Appl. No.: 11/568,966

(22) PCT Filed: May 16, 2005

(86) PCT No.: PCT/NZ2005/000101
§ 371 (c)(1),
(2), (4) Date: Aug. 10, 2007

(87) PCT Pub. No.: WO2005/111524
PCT Pub. Date: Nov. 24, 2005

(65) Prior Publication Data
US 2008/0047691 A1    Feb. 28, 2008

(30) Foreign Application Priority Data
May 18, 2004  (NZ) .................................... 533006

(51) Int. Cl.
*C21C 5/00* (2006.01)
(52) U.S. Cl. ............................ 266/194; 266/46; 266/241
(58) Field of Classification Search ................. 266/193, 266/194, 241, 46
See application file for complete search history.

(56) References Cited

U.S. PATENT DOCUMENTS

| | | | | |
|---|---|---|---|---|
| 4,049,502 A | * | 9/1977 | Nagels | 266/190 |
| 4,157,816 A | * | 6/1979 | Legille | 266/194 |
| 4,230,307 A | * | 10/1980 | Philip | 266/46 |
| 4,235,173 A | * | 11/1980 | Sharp | 110/336 |
| 4,481,024 A | * | 11/1984 | Bly | 65/337 |
| 4,787,605 A | * | 11/1988 | Kaptein | 266/194 |

FOREIGN PATENT DOCUMENTS

| | | |
|---|---|---|
| DE | 12 23 561 B | 8/1966 |
| JP | 02 212322 A | 8/1990 |

OTHER PUBLICATIONS

Supplementary European Search Report (EP05748002) dated Aug. 31, 2007.

* cited by examiner

*Primary Examiner* — Scott Kastler
(74) *Attorney, Agent, or Firm* — Greenberg Traurig, LLP

(57) ABSTRACT

A heat exchanger 10 includes a conduit 12 for conveying cooling fluid relative to a body to be cooled. A heat transfer arrangement 62 is arranged in communication with an interior of the conduit 12, the heat transfer arrangement 62 and the conduit 12 together defining an assembly that is mountable adjacent the body to be cooled, convective heat exchange occurring, in use, due to movement of the cooling fluid relative to the body and the heat transfer arrangement 62 of the assembly and radiant heat exchange occurring between the body and at least part of the heat transfer arrangement 62 of the assembly.

50 Claims, 16 Drawing Sheets

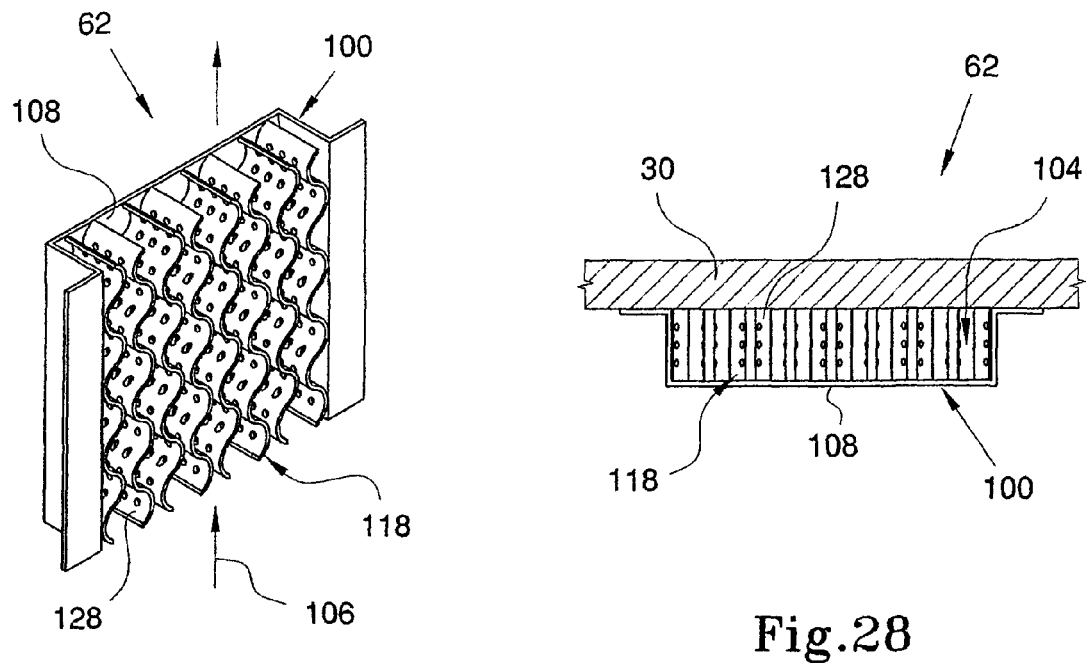
Fig.27
Fig.28
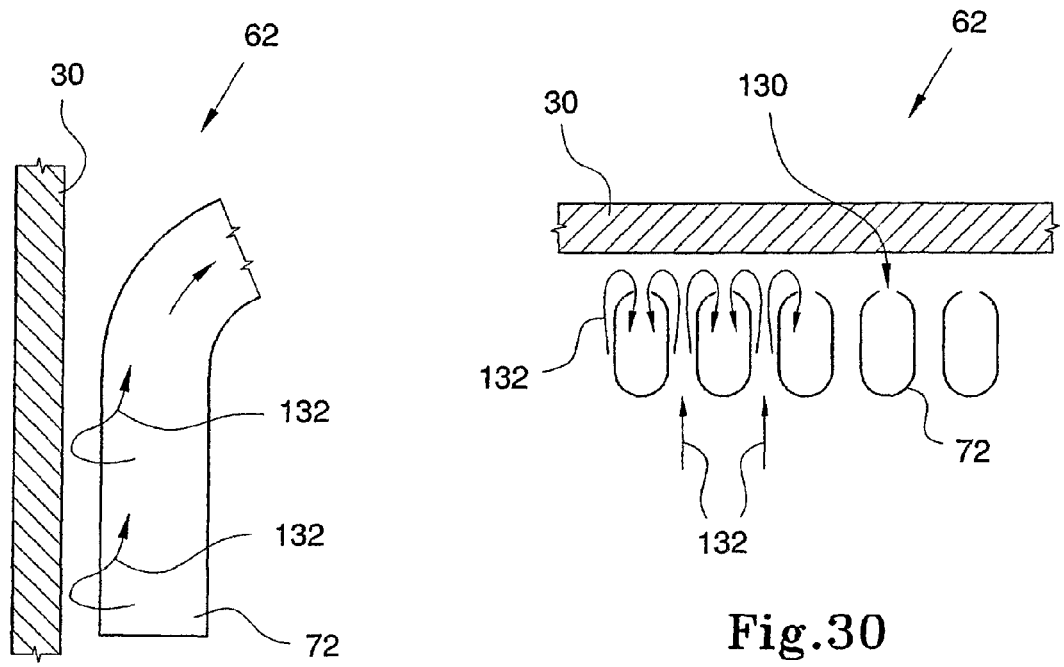
Fig.29
Fig.30

HEAT EXCHANGER

CROSS-REFERENCE TO RELATED APPLICATIONS

This application is a national stage filing under 35 U.S.C. 371 of International Application PCT/NZ2005/000101 filed May 16, 2005, which claims priority from New Zealand Application No. 533006 filed May 18, 2004. The entire teachings of the referenced application is incorporated herein by reference. International Application PCT/NZ2005/000101 was published under PCT Article 21(2) in English.

FIELD OF THE INVENTION

This invention relates to a heat exchanger. The invention relates particularly, but not necessarily exclusively, to a heat exchanger for use in the cooling of furnaces of metalliferous smelters. It will readily be appreciated that the heat exchanger could be used in a wide range of other applications as well.

BACKGROUND TO THE INVENTION

In metalliferous smelters and, in particular, aluminium smelters, the smelter comprises a plurality of pots or furnaces, each having a shell within which an electrolyte and molten metal are contained. Aluminium is produced by an electrolysis process and the temperature of the electrolyte can reach temperatures of approximately 1000° C. This results in substantially elevated temperatures on the shell of each pot. It is therefore necessary to reduce the temperature of these shells to protect the shell from corrosion and catastrophic failure.

In the past, this has been achieved by directing a cooling fluid, such as air, on to the shell at locations which have become excessively hot. This requires very large amounts of compressed air, is extremely inefficient and generates noise and dust hazards for the operators. Moreover, the air can only be applied in this way to the overheated localised parts of a furnace shell. The shell temperature for the great majority of furnaces is not cooled by this means and no overall smelter benefit is derived.

In another development (U.S. Pat. No. 6,251,237 to Bos et al), the installation of permanent ducting as an integral part of each shell has been proposed. Not only does this necessitate a complex conduit system but some form of forced driving of the fluid is required as well.

In addition, to modify smelters to cool them, it may, in certain circumstances, be necessary that each furnace first be shut down. This is economically disadvantageous as any down time of the smelter has adverse economic consequences. More importantly, when a furnace is shut down for any significant length of time, the electrolyte solidifies resulting in major start up procedures having to be effected in order to restart the furnace.

SUMMARY OF THE INVENTION

According to a first aspect of the invention there is provided a smelting furnace heat exchanger which includes:

a conduit for conveying cooling fluid relative to a furnace to be cooled; and a heat transfer arrangement in communication with an interior of the conduit, the heat transfer arrangement and the conduit together defining an assembly that is mountable adjacent the furnace to be cooled, convective heat exchange occurring, in use, due to movement of the cooling fluid relative to the furnace and to the heat transfer arrangement of the assembly and radiant heat exchange occurring between the furnace and at least part of the heat transfer arrangement of the assembly.

Preferably, the assembly is formed in sections which can be arranged in end-to-end relationship with the conduit forming a passage through which the cooling fluid flows as a result of a flue-like effect. With this arrangement, no moving parts for the heat exchanger are required and heat exchange occurs due to temperature differentials and fluid flow through the assembly. At least the heat transfer arrangement is of a heat absorption material and may be a black duct. A "black duct" is to be understood as a duct which has a high heat absorption characteristic, a low radiant heat reflection characteristic and may be metallic. To enhance the heat absorption capabilities of the assembly, the metallic duct may be coated with a heat absorption coating such as a black, heat absorbing paint.

To further encourage heat exchange between fluid in the conduit and the body of the conduit itself, an operatively inner region of the conduit may contain heat exchange elements. The heat exchange elements may be in the form of heat transfer media to effect increased convective heat exchange between the conduit and the cooling fluid within the conduit.

Control of fluid flow through the conduit may be effected by means of control elements arranged in the conduit. For example, the heat exchanger may include one or more dampers arranged in the conduit for controlling flow of the fluid through the conduit.

In a first embodiment of the invention, the heat transfer arrangement may comprise a plurality of fins arranged on an outer surface of the conduit. Spaces between adjacent fins may serve as radiant heat traps to assist in radiant heat transfer between the furnace and the assembly. The fins may be horizontally disposed and vertically spaced. Instead, the fins may be vertically disposed and horizontally spaced, in use, in both cases to provide an increased surface area to effect convective heat exchange between the furnace, the cooling fluid and the assembly.

In smelters, electrical power is provided by way of bus bars to the furnaces of smelters. In the first embodiment of the invention, the heat exchanger may include a deflector arranged, in use, operatively below the assembly for deflecting the cooling fluid into contact with the furnaces to be cooled. The deflector may be in the form of a V-shaped (when viewed end on) deflector plate mounted on the bus bars. The deflector plate may serve to deflect fluid into contact with walls of the furnaces. Convective heating of the fluid encourages fluid flow up along the sides of the furnaces into contact with the assembly. Apertures may be defined in a wall of the conduit intermediate the fins so that fluid heated convectively by the furnaces is drawn into the interior of the conduit to be entrained therein.

To facilitate placement of the assembly in position relative to the furnaces to be cooled, each section of the assembly may be mounted on rollers which, in turn, are supported on the deflector plate.

The heat exchanger may include a fluid entrapment element arranged operatively above the conduit for inhibiting escape or by-passing of heated air. The fluid entrapment element may comprise a hood or cover plate mounted above the assembly which also shrouds the assembly from dust spillage which may otherwise foul the heat exchanger.

The conduit may taper outwardly towards its downstream end to encourage the flue-like effect and drag an even flow of cooling fluid into each section of the conduit. A downstream end of the conduit is connected to a fluid extraction arrangement of the furnace or structure in which the heat exchanger is contained. For example, in the case of an aluminium smelter, the downstream end of the duct may be connected to an extractor fan arrangement of the smelter to provide the force assisted, natural convective flow of the fluid through the conduit. Fluid flowing in the conduit may then convectively cool the conduit with a greater flow than otherwise obtained from a purely natural flue effect.

In certain designs of smelters, space between adjacent cells or furnaces is restricted due to multiple risers which are used for bringing current into a following cell or furnace in the line. In a heat exchanger, in accordance with a variation of the first embodiment of the invention, for use in such smelters, the conduit may be positioned at the level of or in place of a floor grating arranged above bus bars for the furnaces.

If desired, a heat absorbing accessory is mounted to the conduit, on an underside of the conduit, mounted in the floor grating. The accessory may be in the form of a radiant heat capturing element in the form of a lens. The lens may "focus" radiant heat from walls of the furnaces on to the conduit to aid in radiant heat transfer from the walls to the conduit. Instead, the accessory may be in the form of one or more vertical plates for increasing convective heat flow to air which then flows into the conduit.

In a second embodiment of the invention, the heat transfer arrangement may comprise a plurality of spaced ducts, connected by a manifold, to the conduit, the ducts being arranged at spaced intervals along each manifold.

Each duct may be in the form of a substantially channel-shaped section which, in use, is positioned adjacent a wall of the furnace to form a passage through which the cooling fluid can pass. An entry opening of each duct is shaped to reduce a pressure drop associated with entry of the cooling fluid into the duct. Further, the duct may connect to the manifold via an exit opening. Each duct may define a secondary exit opening to allow escape of some of the cooling fluid to atmosphere to provide natural convective flow when no assisted flow is present.

Instead, each duct may be in the form of a tube to be arranged adjacent the wall of the furnace to be cooled. Each tube may be substantially rectangular in cross-section having a high depth to width aspect ratio. The "width" of the tube may be that dimension of the tube parallel to a longitudinal axis of the manifold and the "depth" of the tube may be that dimension of the tube normal to the longitudinal axis of the manifold. Thus, the high depth to width aspect ratio of the tube means that the width of the tube is substantially less than the depth of the tube. In this way, spaces between adjacent tubes may act as thermal radiation traps to assist in radiant heat transfer.

A part of each tube in proximity to the furnace may define at least one aperture to enhance heat transfer between the tube and the furnace due to reduced thermal boundary layers. The aperture may be a slot extending parallel to a longitudinal axis of the tube, the slot being defined in that shorter wall of the slot adjacent the wall of the furnace in use.

In this embodiment of the invention, the heat exchanger may include a shielding element for shielding those parts of a structure in which the furnace to be cooled is located, arranged on an opposite side of the shielding element from the furnace, from radiation heat transfer from the furnace. The shielding element may be in the form of a shield plate which, together with the wall of the furnace, defines a channel through which the cooling fluid can pass to aid in natural convective heat transfer from the wall of the furnace to those parts of the heat transfer arrangement arranged within the channel.

A rising part of each duct may be arranged in the channel so that heat transfer from the furnace to the tubes occurs both by radiation and by convection. Due to the use of the extractor fan, a low pressure region is created within the heat exchanger to cause fluid flow in the heat exchanger. Convective heat transfer between the fluid in the heat exchanger may therefore be effected as a result of the assisted fluid flow through the heat exchanger.

In a version of this embodiment, each duct may have a vertical section entering its manifold via a cranked downstream region of the duct. Cooling fluid may enter the vertical section to be directed into the manifold to effect convective heat transfer.

In another version of this embodiment, each duct may have a horizontal upstream portion leading to a vertical portion arranged between the shielding plate and the furnace. The transition between vertical and horizontal portions of the tubes may induce fluid disturbances to inhibit the build up of thermal and hydrodynamic boundary layers to enhance heat transfer. The length of the vertical portion of each tube may be relatively short further to inhibit the build up of thermal and hydrodynamic boundary layers.

Further, each section of the heat transfer arrangement may comprise a plurality of units, each unit comprising a manifold with its associated ducts, with the manifolds being vertically stacked and the ducts of an upper unit being interleaved with the ducts of a subjacent unit providing short lengths of vertical portions of the ducts facing the wall of the furnace to enhance heat transfer.

An interior of each duct may carry surface increasing components to enhance at least one of convective heat transfer rates and radiant heat transfer rates. The components may be selected from the group consisting of fins, vortex inducing elements and combinations of the foregoing. Instead, or in addition, the components may include foraminous elements, such as porous media.

According to a second aspect of the invention, there is provided a smelting furnace heat exchanger which includes at least one duct to be placed in proximity to a furnace to be cooled, heat exchange between the furnace and the at least one duct occurring due to radiant heat transfer between the furnace and the at least one duct and due to convective heat transfer to a fluid that absorbs heat both from the furnace and from the at least one duct.

According to a third aspect of the invention, there is provided a method of cooling a smelting furnace which includes:

mounting a heat transfer arrangement of a heat exchanger assembly, the assembly including a conduit of a heat absorbing material, in proximity to the furnace so that radiant heat exchange between the furnace and at least a part of the heat transfer arrangement occurs; and directing cooling fluid past the furnace, into contact with the heat transfer arrangement and into the conduit so that convective heat exchange between the fluid, the furnace and the heat transfer arrangement occurs.

The method may include assisting convective flow of the fluid through the heat transfer arrangement and the conduit. Thus, the method may include effecting the assistance by creating a low pressure region in a passage of the conduit, for example, by connecting a downstream end of the passage to an extractor fan of an installation in which the heat exchanger is mounted.

This may include forming the heat exchanger assembly in sections and arranging the sections in end-to-end relationship with the conduit forming the passage through which the fluid flows as a result of a flue-like effect.

Further, the method may include effecting increased convective heat exchange between the conduit and the fluid in the conduit by passing the fluid over heat exchange elements contained in the conduit.

In addition, the method may include controlling fluid flow through the conduit by means of control elements arranged in the conduit.

In a first embodiment, the heat transfer arrangement may comprise a plurality of fins arranged on an outer surface of the conduit and the method may include passing the fluid through spaces between adjacent fins, the spaces serving as radiant heat traps to assist in radiant heat transfer between the furnace and the assembly.

The method may include mounting the assembly between a plurality of furnaces to be cooled and deflecting fluid into contact with walls of the furnaces and drawing the fluid into the interior of the conduit through apertures defined. intermediate the fins in walls of the conduit.

The method may also include arranging a fluid entrapment element operatively above the conduit for inhibiting escape or by-passing of heated air.

Still further, the method may include connecting a downstream end of the conduit to a fluid extraction arrangement.

In a variation of this embodiment, the method may include positioning the conduit in proximity to a floor of a structure in which the furnace is contained. The method may include mounting a heat absorbing accessory to the conduit.

In a second embodiment, the method may include mounting a plurality of ducts of the heat transfer arrangement at spaced intervals along the furnace, adjacent a wall of the furnace, and connecting a plurality of the ducts to the conduit by at least one manifold. Further, the method may include shaping an entry opening of each duct to reduce a pressure drop associated with entry of cooling fluid into the duct. In addition, the method may include connecting an exit opening of the duct to the manifold. Also, the method may include providing natural convective flow when no assisted flow is present by allowing escape of some of the cooling fluid to atmosphere through a secondary exit opening defined in each duct.

The method may include enhancing heat transfer between the duct, which is in the form of a tube, and the furnace by passing the fluid through an aperture defined in a wall of the tube.

The method may include mounting a shielding element in spaced relationship relative to a wall of the furnace for shielding those parts of a structure in which the furnace to be cooled is located, arranged on an opposite side of the shielding element from the furnace, from radiation heat transfer from the furnace. Then, the method may include passing the fluid through a channel defined between the shielding element and the wall of the furnace to aid in natural convective heat transfer from the wall of the furnace to those parts of the heat transfer arrangement arranged within the channel.

The method may include arranging a rising part of each duct in the channel so that heat transfer from the furnace to the ducts occurs both by radiation and by convection. Due to the use of the extractor fan, a low pressure region is created within the heat exchanger to cause fluid flow in the heat exchanger. Convective heat transfer between the fluid in the heat exchanger may therefore be effected as a result of the assisted fluid flow through the heat exchanger.

The method may include enhancing at least one of convective heat transfer and radiant heat transfer by passing the fluid over surface increasing components arranged in an interior of each duct.

BRIEF DESCRIPTION OF THE DRAWINGS

Exemplary embodiments of the invention are now described with reference to the accompanying diagrammatic drawings in which:

FIG. 27 shows a schematic, three dimensional view of a fifth variation of the art of the heat transfer arrangement of FIG. 15;

FIG. 28 shows a schematic, sectional plan view of the part of the heat transfer arrangement of FIG. 27;

FIG. 29 shows a schematic, sectional side view of another embodiment of a part of a heat transfer arrangement of the heat exchanger; and FIG. 30 shows a schematic, sectional plan view of the part of the heat transfer arrangement of FIG. 29.

DETAILED DESCRIPTION OF EXEMPLARY EMBODIMENTS

Figure 1:
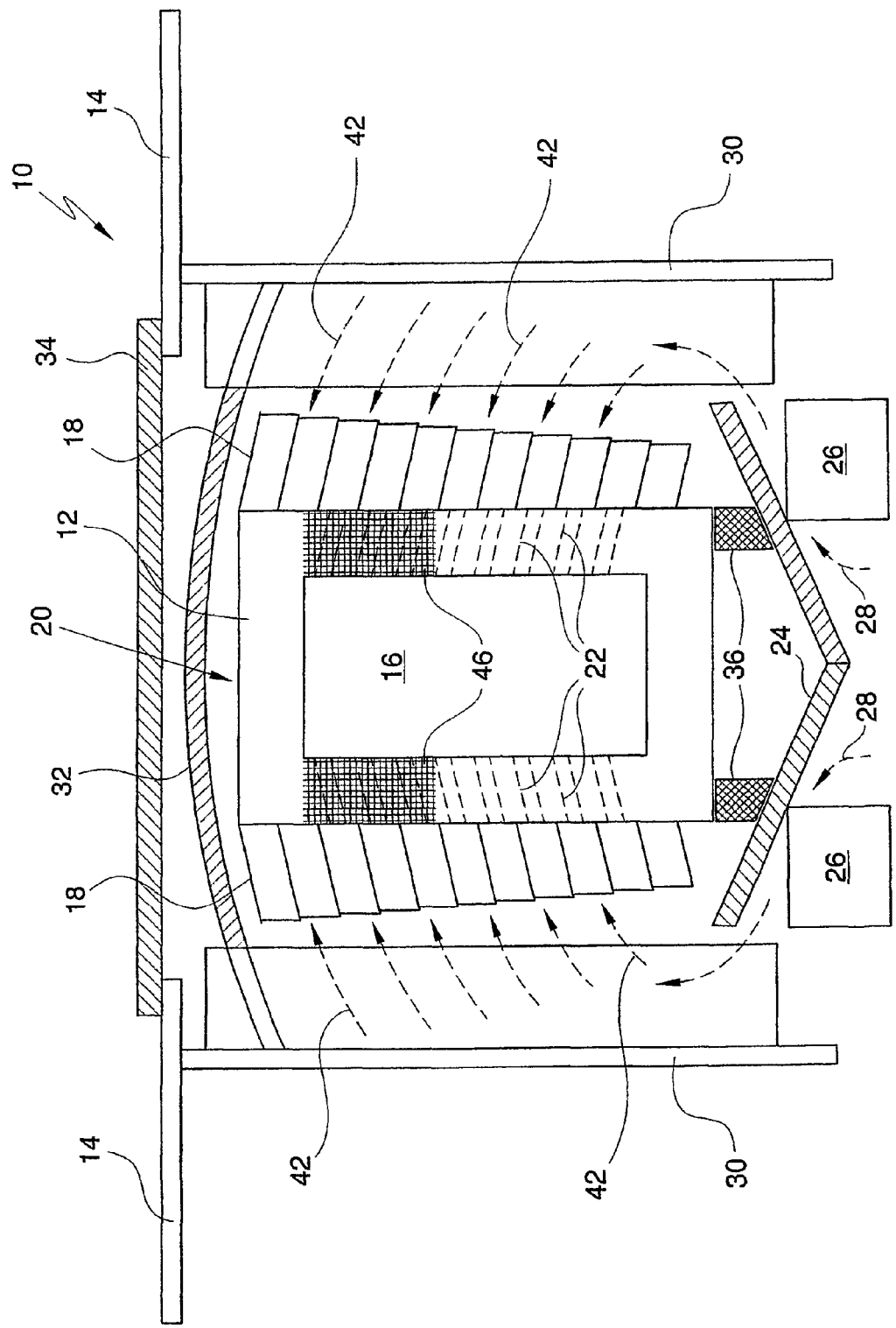
FIG. 1 shows a schematic, end view of a heat exchanger, in accordance with a first version of a first embodiment of the invention.
Figure 2:
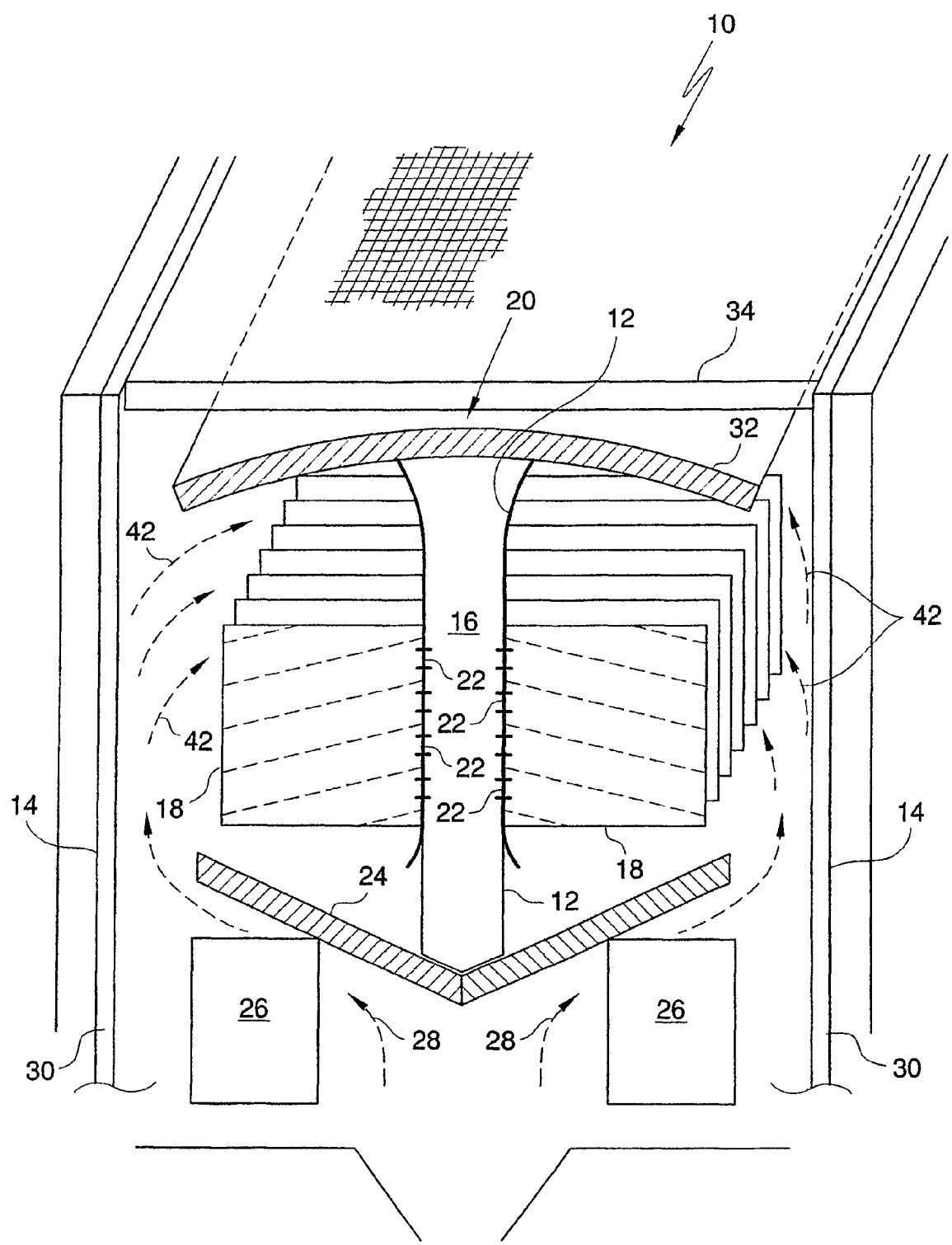
FIG. 2 shows a schematic, three dimensional end view of a heat exchanger in accordance with a second version of the first embodiment of the invention.

In FIGS. 1 to 6 of the drawings, reference numeral 10 generally designates a heat exchanger, in accordance with a first embodiment of the invention. The heat exchanger 10 includes a conduit 12 which, in use, is arranged between two bodies, in the form of furnaces, illustrated schematically at 14, to be cooled. The conduit 12 defines a passage 16.

A heat transfer arrangement in the form of a plurality of spaced fins 18 is attached to an exterior surface of the conduit 12. An assembly comprising the conduit 12 and the fins 18 is referred to below, for ease of explanation, as a duct 20.

In the embodiment illustrated in FIG. 1 of the drawings, the fins 18 are vertically spaced and substantially horizontally disposed or at a slight angle to the horizontal.

The duct 20 is of a heat absorbing material. More particularly, the duct 20 is of an aluminium material and is coated with a heat absorbing material to enhance the heat absorption characteristics of the duct 20. For example, the duct 20 is coated with a black, heat absorbing paint.

The passage 16 of the conduit 12 of the duct 20 is connected, at an egress end, to a fluid extraction arrangement of a smelter in which the furnaces 14 are contained. More particularly, the passage 16 is connected to an extractor fan (not shown) to create a low pressure region in the heat exchanger 10 to encourage fluid flow through the passage 16.

The conduit 12 has a plurality of apertures, illustrated schematically at 22, through which air can flow into the passage 16 of the duct 20.

The heat exchanger 10 includes a deflector in the form of a V-shaped deflector late 24 arranged beneath the duct 20.

Typically, the furnaces 14 of the smelter are provided with electrical power by means of bus bars 26. The deflector plate 24 is mounted on the bus bars 26 to deflect air, illustrated schematically at 28, around the deflector plate 24 into contact with side walls 30 of the furnaces, as will be described in greater detail below.

A fluid entrapment means in the form of a hood or cover plate 32 is mounted above the duct 20 to trap air 28 and direct it towards the fins 18 of the duct 20. The hood 32 also shrouds the heat exchanger 10 against dust ingress from above.

A mesh 34 is mounted above the hood 32 so that any air 28 which does escape can pass through the mesh 34.

As described above, in the embodiment illustrated in FIG. 1 of the drawings, the fins 18 are vertically spaced. In the embodiment illustrated in FIGS. 2 to 4 of the drawings, in which like reference numerals refer to like parts unless otherwise specified, the fins 18 are vertically disposed and substantially horizontally spaced.

Referring again to FIG. 1 of the drawings, it is to be noted that the duct 20 is mounted via insulated rollers 36 on the deflector plate 24.

The duct 20 is, preferably, formed in lengths or sections to be wheeled into position between two furnaces 14 and secured in end-to-end relationship with an end-most length or section having its downstream end connected to the extractor fan of the smelter, preferably via the individual furnace extraction ducts already in place for the furnaces.

Figure 3:
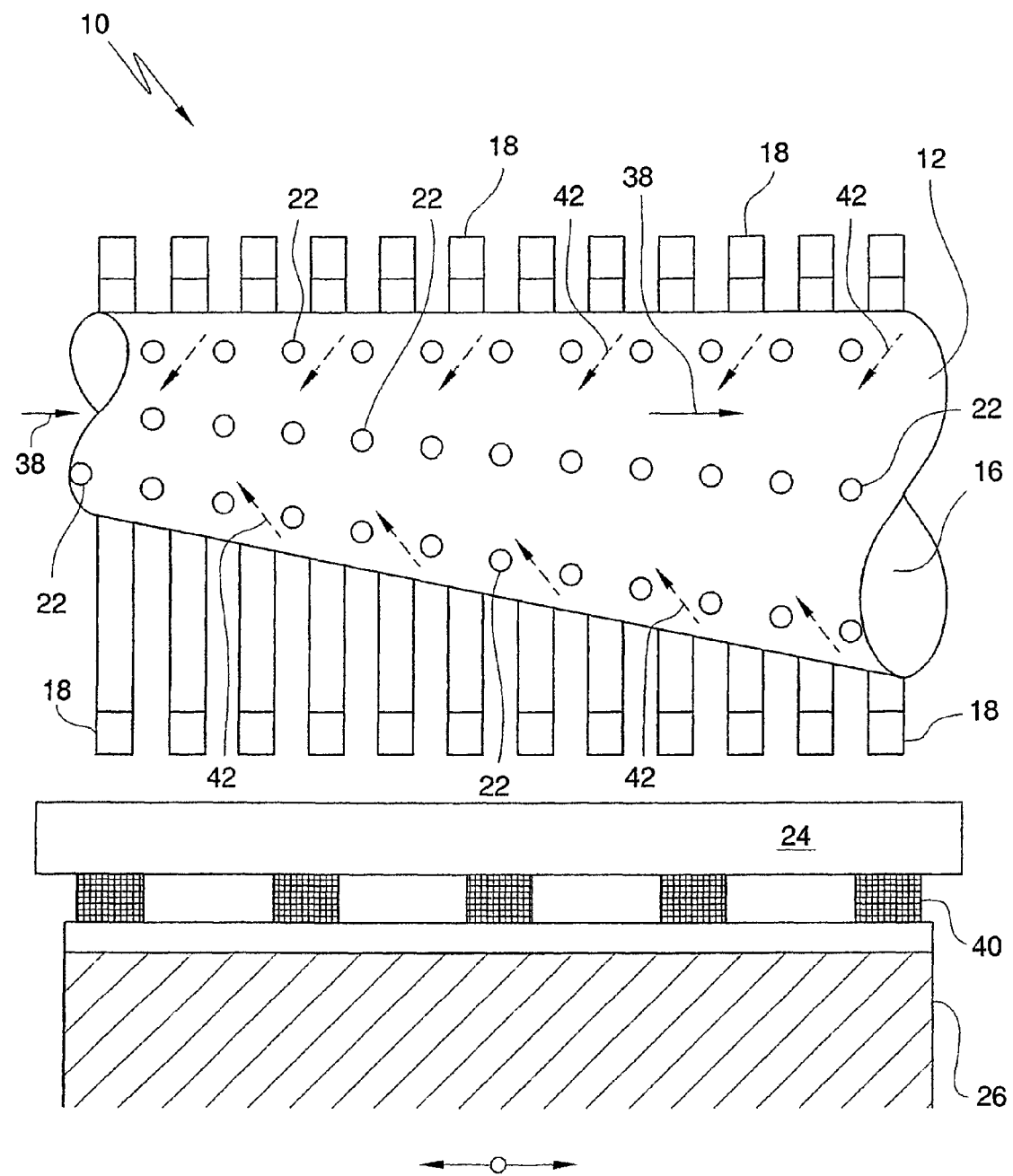
FIG. 3 shows a schematic, side view of part of the heat exchanger of FIG. 2.
Figure 4:
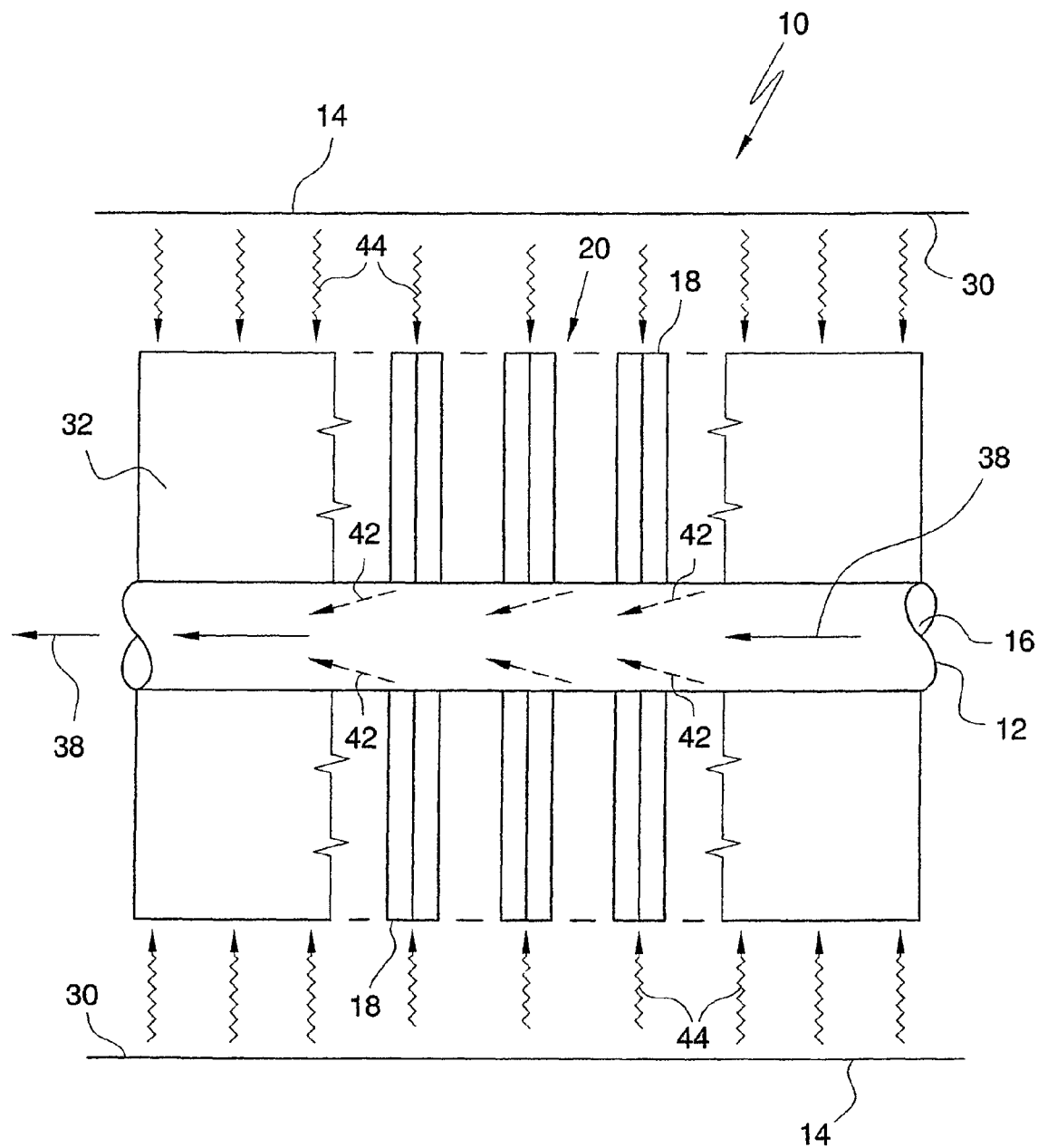
FIG. 4 shows a schematic, plan view of part of the heat exchanger of FIGS. 2 and 3.

To encourage flow of air, as indicated by arrows 38, through the passage 16 of the duct 20, the passage 16 flares outwardly towards its downstream end, as shown in greater detail in FIG. 3 of the drawings. Also, referring to FIG. 3 of the drawings, it is to be noted that the deflector plate 24 is mounted via rollers 40 on the bus bars 26 to facilitate placement of the deflector plate 24 and the duct 20 positioned relative to the furnaces 14. The rollers 40 also electrically insulate the duct 20 from the bus bars 26.

Figure 5:
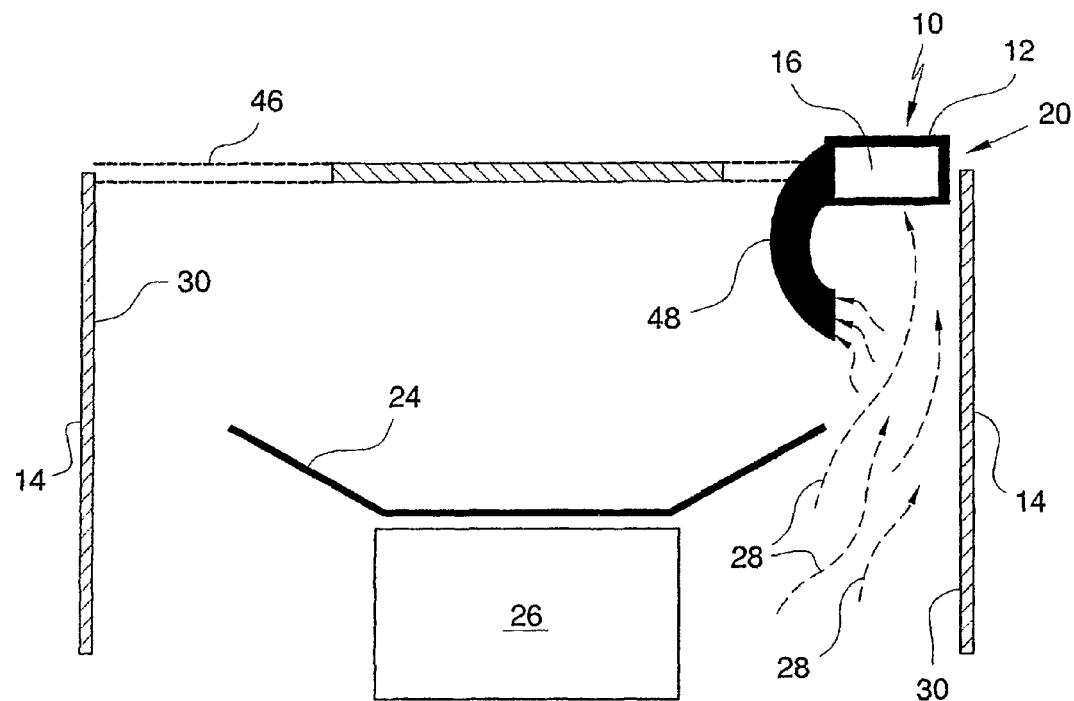
FIG. 5 shows a schematic, end view of a variation of the heat exchanger in accordance with the first embodiment of the invention.
Figure 6:
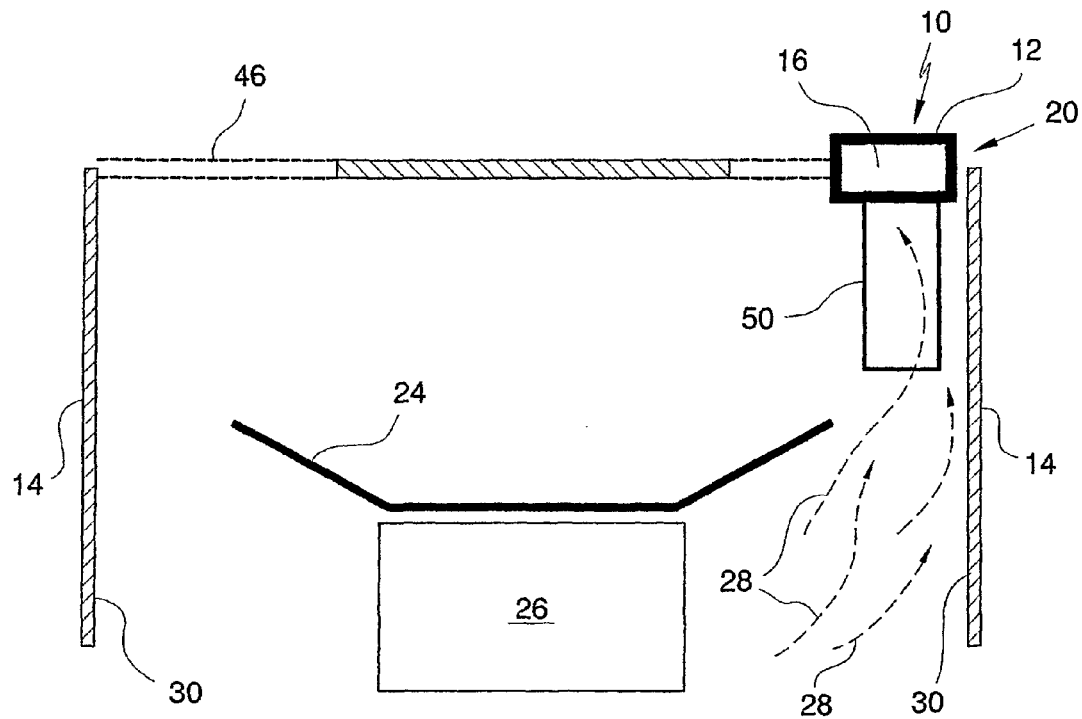
FIG. 6 shows a schematic, end view of a further variation of the heat exchanger in accordance with the first embodiment of the invention.
Figure 7:
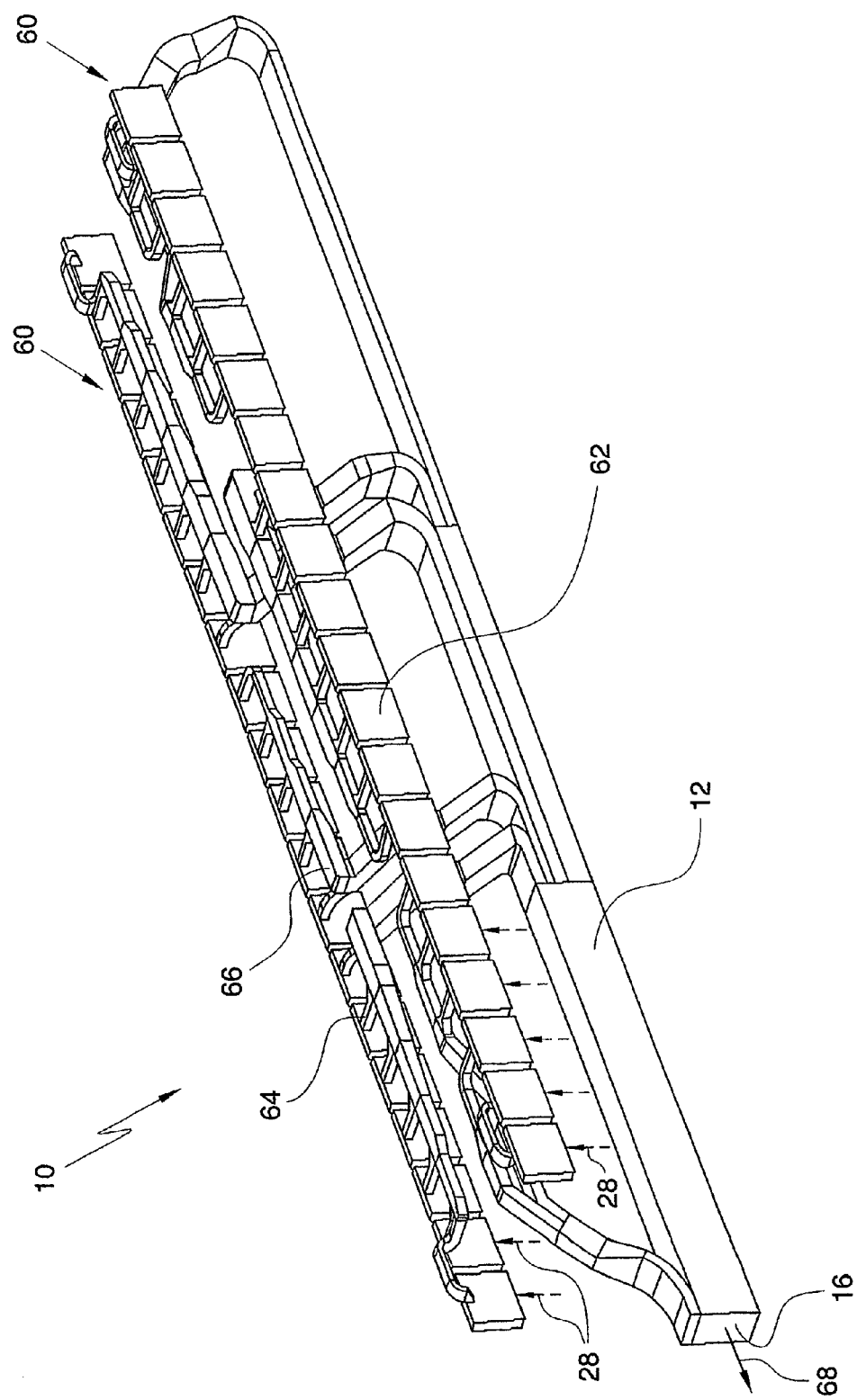
FIGS. 7-9 show three dimensional views of heat exchangers in accordance with a second embodiment of the invention.

Referring now to FIGS. 5 and 6 of the drawings, two variations of the first embodiment are illustrated. Once again, with reference to FIGS. 1 to 4 of the drawings, like reference numerals refer to like parts, unless otherwise specified.

In the design of certain smelters, multiple side risers are used for bringing current into a following cell or furnace in the line. As a result of these risers, there is very limited room to install the duct 20.

In such smelters, the bus bars providing power to the furnaces 14 are arranged below floor level beneath a grating or floor slabs.

In the two variations of the first embodiment illustrated in FIGS. 5 and 6 of the drawings, the existing grating for each furnace is replaced with a new grating 46 with a duct 20 of the heat exchanger 10 mounted in the plane of the grating 46.

It is envisaged that, with this arrangement, heat transfer between the external walls 30 of the furnaces 14 and the duct 20 could occur convectively without the need for any further heat transfer devices.

However, in the variation shown in FIG. 5 of the drawings, to encourage radiant heat exchange between the walls 30 of the furnaces 14 and the duct 20, an accessory in the form of a lens 48 is mounted on the duct 20. The lens 48 encourages radiant heat capture from the walls 30 of the furnaces 14 to be released into the passage 16 of the conduit 12 of the duct 20.

In the variation shown in FIG. 6 of the drawings, a plate-like accessory 50 is attached to the duct 12 to encourage convective heat flow from the walls 30 of the furnaces 14 into the passage 16 of the conduit 12 of the duct 20.

In use, in the embodiments illustrated in FIGS. 1 to 4 of the drawings, sections of the duct 20 of the heat exchanger 10 are positioned in end-to-end, connected relationship between two furnaces 14 to be cooled. The downstream end of the passage 16 of the duct 20 is connected to the extractor fan of the smelter. This creates a low pressure zone in the passage and encourages air flow through the passage 16 as indicated by the arrows 38. A flue-like effect is therefore created in the passage 16 of the duct 20. In the embodiments illustrated in FIGS. 5 and 6 of the drawings, sections of the duct 20 of the heat exchanger 10 and the new grating 46 are positioned in place of the original gratings. The sections of the duct 20 are connected together in end-to end relationship along the length of each furnace 14 to be cooled. The downstream end of the passage 16 of the duct is, as is the case in respect of the other embodiments, connected to the extractor fan of the smelter to create air flow through the passage 16 of the duct 20.

Cool air from a basement (not shown) of the smelter flows between the furnaces 14 as indicated by the arrows 28 until it impinges on the deflector plate 24 where it is forced to diverge into impingement with the walls 30 of each of the furnaces 14 to be cooled. This creates a first stage of cooling by fan-assisted, natural, convective heat flow.

Due to the extractor fan drawing air through the passage 16 of the duct 20, a low pressure area is created in the passage 16 in comparison with the exterior of the duct 20. As a result, the air heated by the walls 30 of the furnaces 14 is accelerated up the furnace walls 30 and is drawn in, through the apertures 22 of the conduit 12, into the passage 16 as indicated by arrows 42.

Prior to the air entering the interior of the conduit 12 of the duct 20, the air must pass between the fins 18 or between the plate-like accessories 50 or through the radiative lens 48, as the case may be. These items 18, 48, 50 absorb radiant heat emitted from the walls 30 of the furnace 14 as indicated, for example, by arrows 44 in FIG. 4 of the drawings. In addition, the relevant items 18, 48 or 50 act as a heat sink for the conduit 12 itself. The air impinging on the items 18, 48, 50 cools them convectively in the second stage of heat transfer.

When the air enters the passage 16 of the conduit 12 of the duct 20, it is entrained in the draft and is drawn towards the exit end of the passage 16. As it passes through the passage 16, the air cools the conduit 12 convectively. To enhance cooling of the conduit 12 of the duct 20, the interior of the conduit 12 has a heat transfer mesh 46, or other heat transfer media, contained therein, as shown in FIG. 1 of the drawings. This further enhances heat transfer between the duct 20 and the air passing through the passage 16 to effect cooling of the duct 20 and to maintain a sufficient thermal gradient between the duct 20 and the walls 30 of the furnace 14 so that radiant heat exchange can occur between the walls 30 of the furnaces 14 and the duct 20 of the heat exchanger 10.

Referring to FIGS. 7 to 14 of the drawings, a second embodiment of the heat exchanger 10 is illustrated and described. With reference to the previous drawings, like reference numerals refer to like parts, unless otherwise specified. In the example shown in FIG. 7 of the drawings, the heat exchanger 10 comprises two banks 60 of heat exchanger sections 62. The heat exchanger sections 62 are connected via duct branches 64 and duct connectors 66 to the conduit 12 defining the passage 16. In the version shown in FIG. 7 of the drawings, the conduit 12 is maintained at basement level and exits outside a furnace building out of a work zone of operators of the furnace. Thus, air heated in the heat exchanger 10 is discharged, as indicated by arrow 68, through the passage 16 of the conduit 12.

Figure 8:
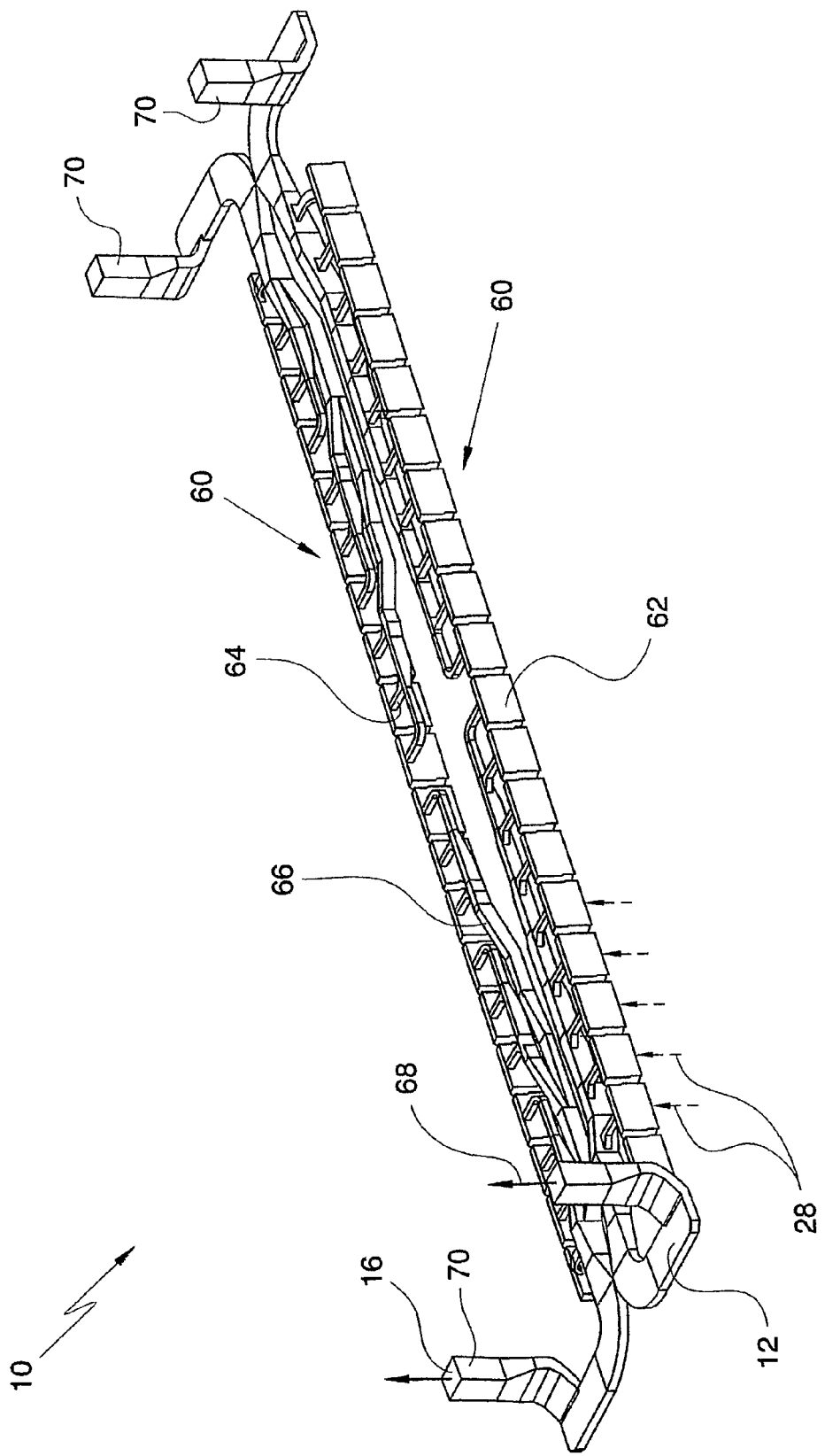

Referring to FIG. 8 of the drawings, once again, the heat exchanger 10 is made up of two banks 60 of heat exchanger sections 62. In this embodiment, each bank 60 is bifurcated to have two stacks 70, one at each end of the bank 60, through which heated air is expelled above the operators' work zone.

Figure 9:
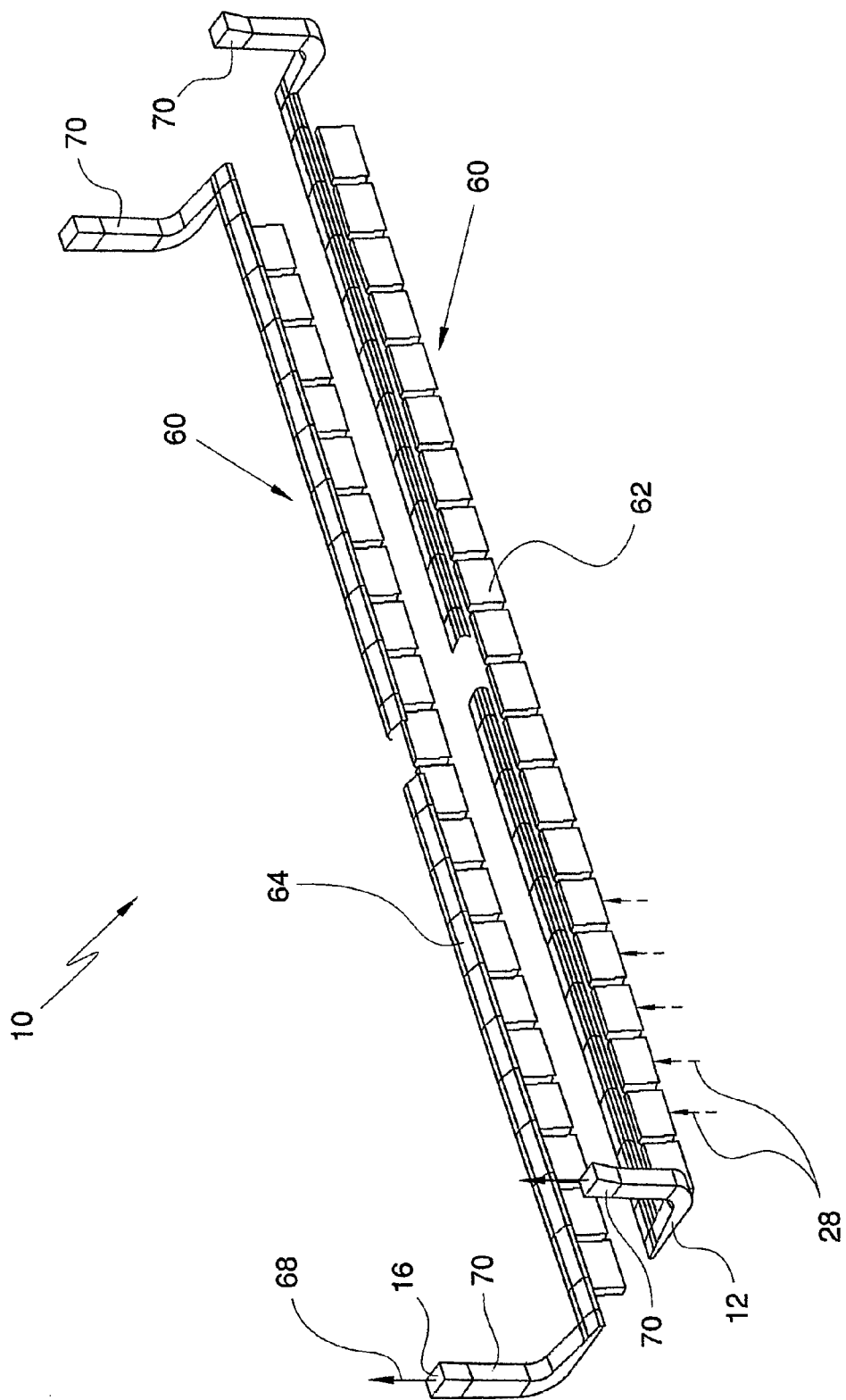

Similarly, in the version of the heat exchanger shown in FIG. 9 of the drawings, the banks 60 are bifurcated to have a stack 70 at each end through which air is expelled as indicated by the arrows 68. It is to be noted that the duct 20 in the embodiments shown in FIGS. 5 and 6 could be connected to similar stacks 70 to carry heated air away from the workers' environment.

In the case of the versions in both FIGS. 8 and 9, therefore, the air heated in the heat exchanger 10 is expelled at a region above the operators' work zone. In all three versions, exposure of the operators to heat stress arising from operation of the heat exchanger 10 is reduced.

Figure 10:
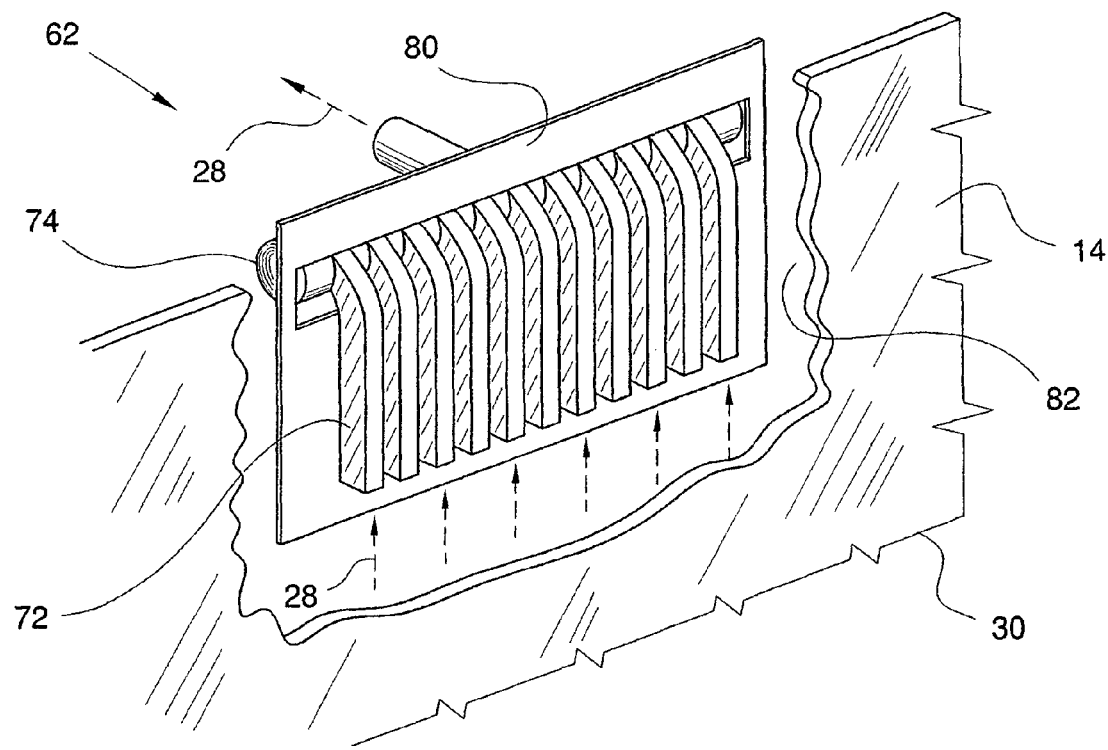
FIG. 10 shows a three dimensional view of a heat exchanger section of a first version of the heat exchanger in accordance with the second embodiment of the invention.
Figure 11:
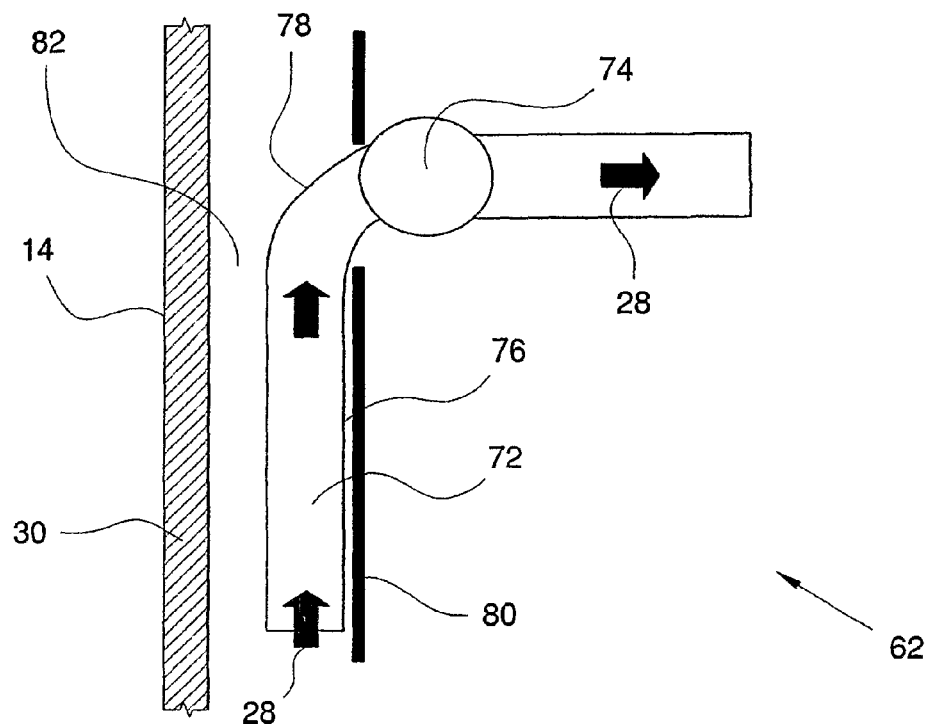
FIG. 11 shows a schematic end view of the section of FIG. 10.

Referring to FIGS. 10 and 11 of the drawings, one of the sections 62 of the heat exchanger 10, in accordance with a first version of the second embodiment of the invention, is described in greater detail.

In this embodiment of the invention, each section 62 of the heat exchanger 10 comprises a heat transfer arrangement which is in the form of a plurality of spaced tubes 72. The tubes 72 are connected to a manifold 74. The manifold 74 connects the tubes 72 of each section 62 to the duct branches 64 which, in turn, are connected via the connectors 66 to the conduit 12.

Each tube 72 has a high depth to width aspect ratio (as defined). In this way, spaces between adjacent tubes act as thermal radiation traps assisting in the radiative heat transfer process.

Each tube 72 has a vertical or rising part 76 and is connected to its manifold 74 via a cranked part 78.

The vertical part 76 of each tube 72 is contained behind a shielding plate 80. The shielding plate 80 is arranged substantially parallel to the wall 30 of the furnace 14 to create a channel 82 in which the cooling air 28 rises due to natural convective flow. This natural convective heat flow in the channel 82 assists in cooling of the furnace 14 and can be of benefit if the forced air flow in the passage 16 of the conduit 12 fails for any reason allowing increased time periods to recommence the force assisted air flow in the passage 16 of the conduit 12 of the heat exchanger 10.

It is to be noted that the tubes 72 are located in close proximity to the wall 30 of the furnace 14. Radiant and natural convection heat transfer mechanisms transfer heat from the wall 30 of the furnace 14 to the heat exchanger tubes 72. These heat exchanger tubes 72 have a high thermal conductivity and absorb high levels of heat from the walls 30 of the furnace 14. As indicated above, the high depth to width aspect ratio of the heat exchanger tubes 72 provide spaces between adjacent tubes 72, the spaces acting as thermal radiation traps which assist the radiative heat transfer process. In addition, natural convection from the wall 30 of the furnace 14 transfers some heat into the heat exchanger tubes 72.

As described above, the downstream end of the conduit 12 is connected to the extractor fan of the furnace building, the fan creating a low pressure region in the passage 16. It will appreciated that this also creates a low pressure region in all parts of the heat exchanger 10 upstream of the passage 16. Thus, the cooling air 28 is drawn into the tubes 72 as shown in FIG. 11 of the drawings. Instead of the downstream end of the conduit 12 being connected to the extractor fan of the building, a separate fan or fans may be provided for the sole purpose of extracting the fluid from the heat exchanger 10. A downstream end of the conduit 12 could, instead, be connected to a thermally driven, external chimney utilising a "stuck effect" to provide a low pressure region to encourage air flow through the conduit 12.

This cooling air 28 moves vertically within the heat exchanger tubes 72 which have been radiatively heated by the wall 30 of the furnace 14. Heat is transferred from the heat exchanger tubes 72 to the air flowing within the tubes 72 via forced convection. The velocity of the air within the heat exchanger 10 is such as to cause high rates of heat transfer from the surfaces of the heat exchanger tubes 72 to the air 28 flowing in the tubes 72.

To assist in this heat transfer, internal surfaces of each of the tubes 72 may include extended surface features (not shown), such as porous media, to increase heat transfer rates.

Air 28 exiting the tubes 72 meets the cranked region 78 of each tube 72. This cranked region 78 assists in breaking down thermal and hydrodynamic boundary layers, the breaking down of the boundary layers assisting in promoting convective heat transfer from the tubes 72 to the air 28.

Figure 12:
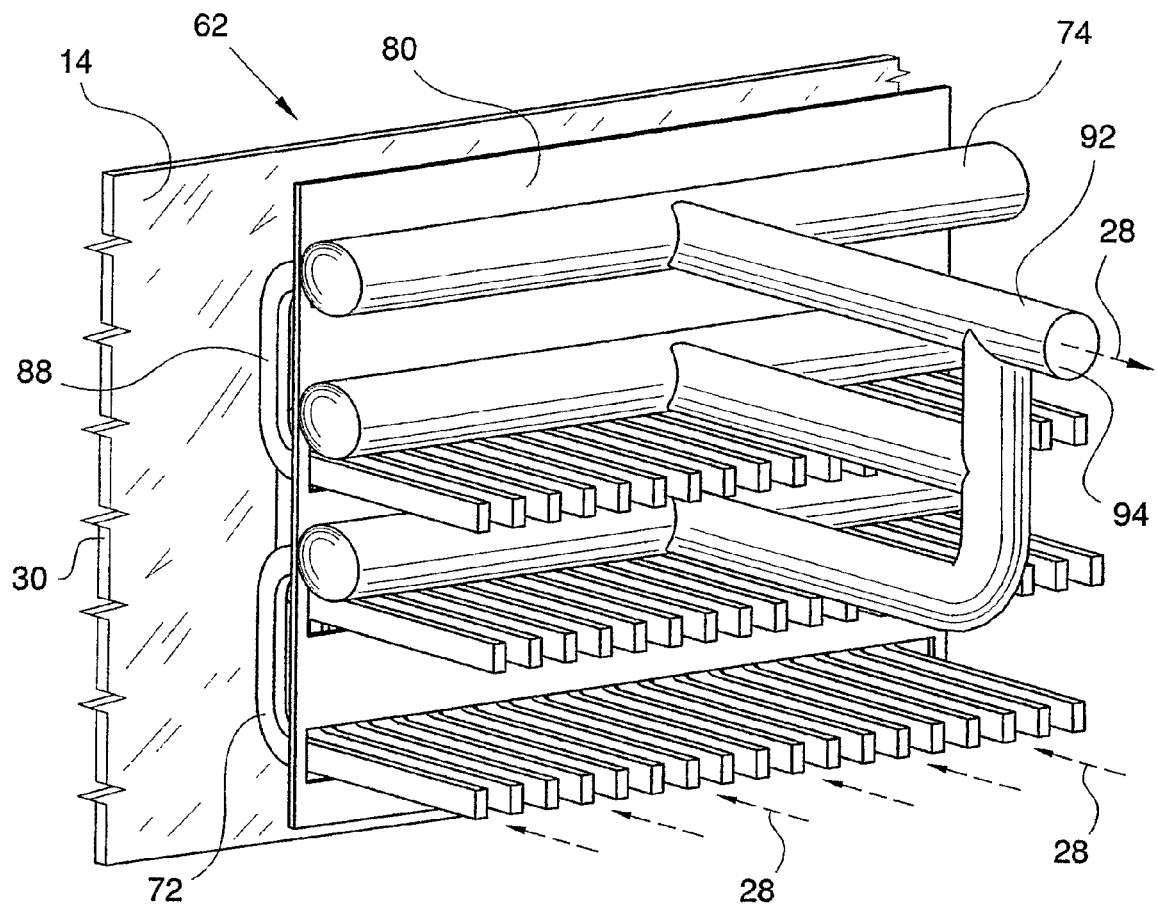
FIG. 12 shows a three dimensional view of another version of a heat exchanger section of the heat exchanger in accordance with the second embodiment of the invention.
Figure 13:
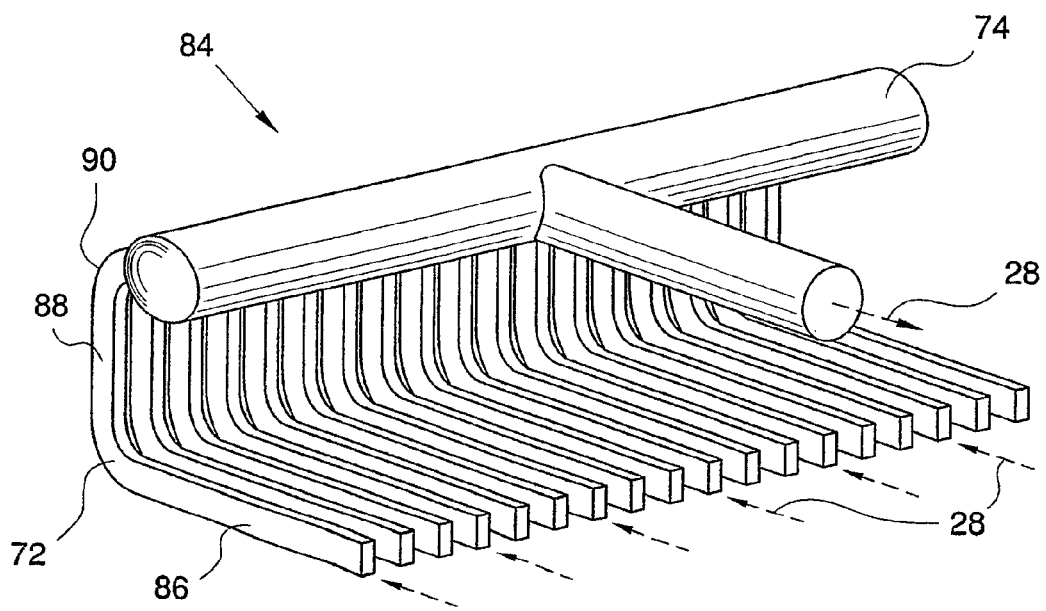
FIG. 13 shows a three dimensional view of one unit of the section of FIG. 12.
Figure 14:
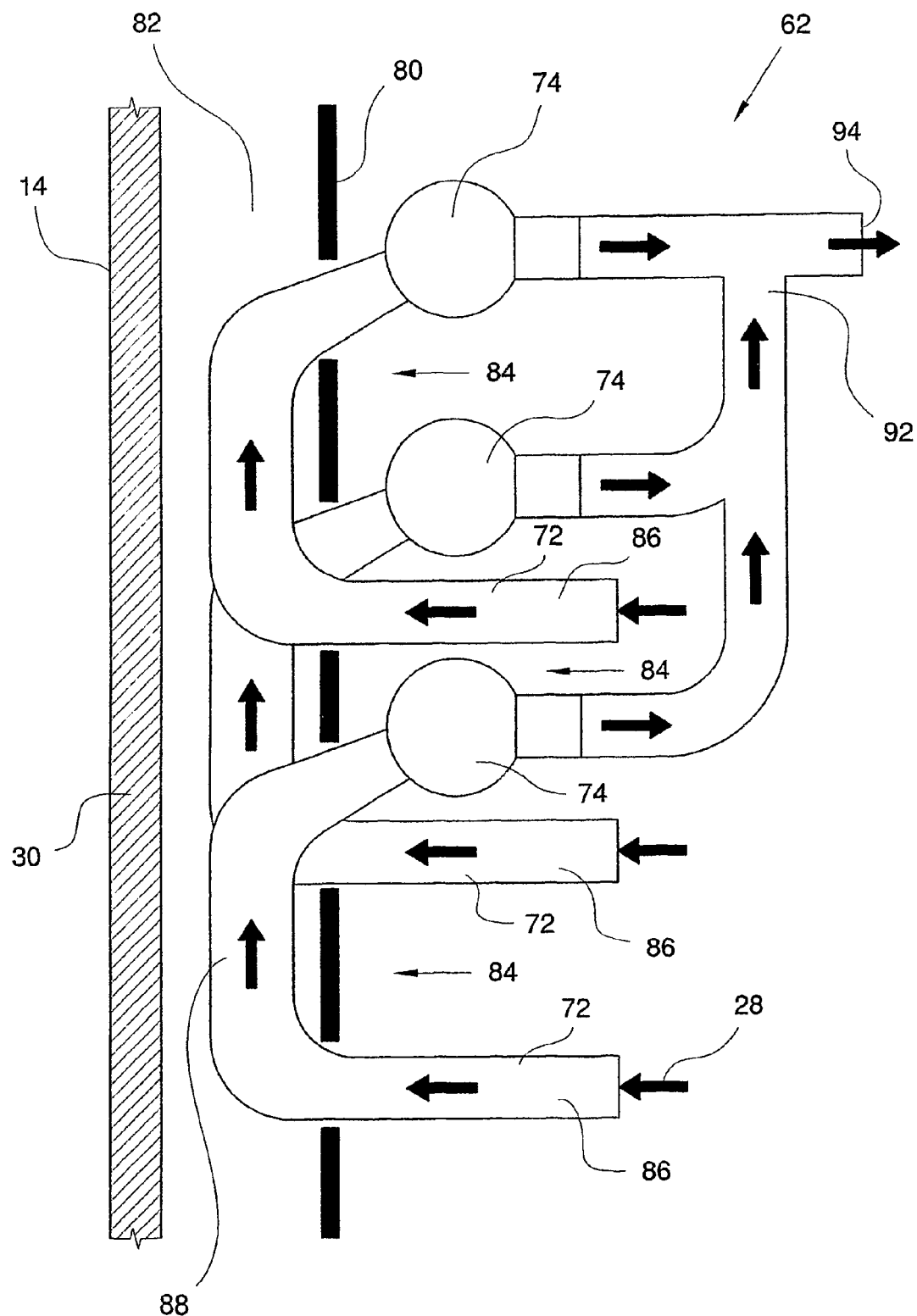
FIG. 14 shows a schematic, end view of the section of FIG. 12.

Referring to FIGS. 12-14 of the drawings, another version of the second embodiment of the heat exchanger 10 is described. Each heat exchanger section 62 comprises a plurality of units 84, one of which is shown in greater detail in FIG. 13 of the drawings. Each unit 84 comprises a manifold 74 and a plurality of heat exchanger tubes 72 arranged at spaced intervals along the length of the manifold 74.

In this version of the second embodiment, each tube 72 has a horizontal upstream section 86 feeding into a vertical part 88 which, in turn, feeds into a cranked part 90 prior to entry into the manifold 74.

As shown more clearly in FIG. 14 of the drawings, the vertical part 88 of each tube 72 is maintained in the channel 82 between the wall 30 of the furnace 14 and the shield plate 80.

Further, in this embodiment, the manifolds 74 of the units 84 are stacked in vertically spaced relationship so that the horizontal parts 86 of the tubes 72 of an upper unit 84 are interleaved with the tubes 72 of a subjacent unit with the horizontal parts 86 of the tubes 74 being arranged below the manifolds 74 of the subjacent unit 84.

The manifolds 74 are connected to a downstream manifold 92 having an outlet passage 94 which connects to the duct branches 64 and, via the duct connectors 66, to the conduit 12.

In this version of the second embodiment of the heat exchanger 10, air 28 is drawn into the horizontal parts of the tubes 86 due to the forced flow in the passage 16 of the conduit 12. The air 28 traverses the vertical part 88 of each of the tubes 72. The change in air flow direction enhances heat transfer through disturbance of thermal and hydrodynamic boundary layers. In addition, the vertical length 88 is short relative to the full length of the tube 72. This further enhances heat transfer by inhibiting build up of thermal and hydrodynamic layers in the vertical parts 88 of the tubes 72.

Referring now to FIGS. 15 to 28, yet a further variation of the second embodiment of the heat exchanger 10 is described. Once again, with reference to the previous drawings, like reference numerals refer to like parts, unless otherwise specified.

Figure 15:
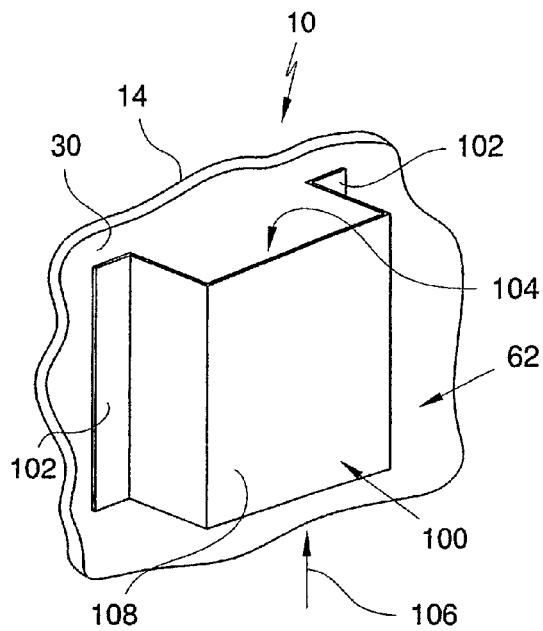
FIG. 15 shows a schematic, three dimensional view of a part of a heat transfer arrangement of the heat exchanger in accordance with yet a further embodiment of the invention.
Figure 16:
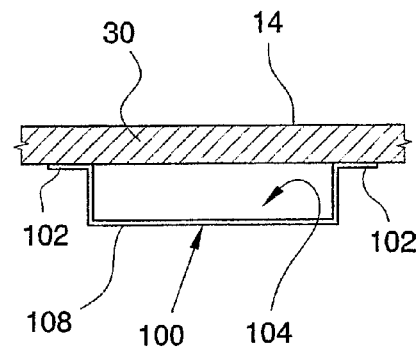
FIG. 16 shows a schematic, sectional plan view of the part of the heat transfer arrangement of FIG. 15.

In this variation of the second embodiment of the invention, each section 62 of the heat transfer arrangement of the heat exchanger 10 comprises at least one channel-shaped duct 100 (one of which is shown) having a pair of outwardly extending flanges 102. These flanges 102, in use, are placed against an outer surface of the wall 30 of the furnace 14 to be cooled as shown in FIGS. 15 and 16 of the drawings. In so doing, a passage 104 is formed. The cooling fluid or air passes through the passage in the direction of arrow 106.

To encourage heat exchange between the wall 30 of the furnace 14 and the duct 100, internal surfaces of the duct 100 are prepared or coated to provide a high emissivity surface to encourage heat absorption from the furnace wall 30. Typically, the duct 100 is of a suitable metal and is coated with black heat absorption paint to encourage heat transfer.

Radiant heat exchange occurs between the furnace wall 30 and, particularly, the wall 108 of the heat exchanger duct 100 spaced from the furnace wall 30. Convective heat exchange occurs due to the passage of air through the passage 104, through an exit opening 110 (FIGS. 18A and 18B) and into the manifold 74 (not shown in FIGS. 15 to 28). As described above, the air from the manifold is drawn into the passage 16 of the conduit 12 for expulsion from the structure in which the furnaces 14 are arranged. Once again, convective heat exchange occurs due to assisted flow of the air through the ducts 100, the manifolds 74 and the conduits 12 by connecting an egress end of the conduit 12 to a suitable extractor fan. Additionally, natural convective flow is enhanced due to the flue-like effect created by the stacks 70.

Figures 17A, 17B, 17C:
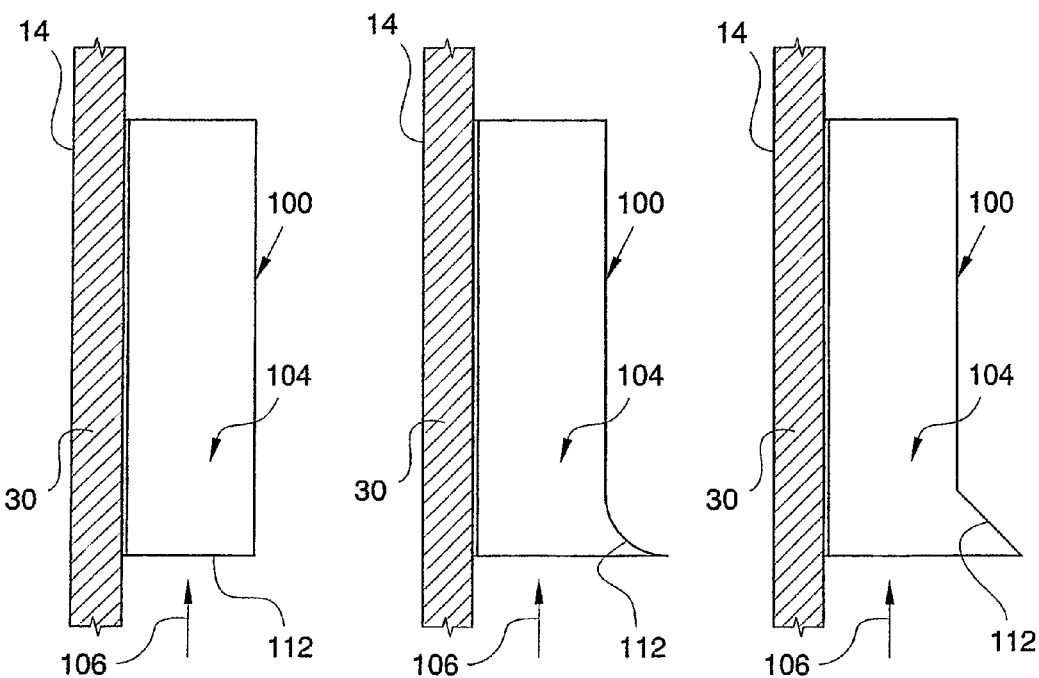
FIGS. 17A-17C show three variations of entrance openings of the part of the heat transfer arrangement of FIG. 15.

An inlet opening 112 of each duct 100 may be square as shown in FIG. 17A of the drawings. Instead, the inlet opening 112 may be shaped (as shown in FIGS. 17B and 17C of the drawings) to reduce the pressure drop associated with entry into the duct 100. For a standard, straight edge entry opening 112, as shown in FIG. 17A of the drawings, the pressure loss coefficient is 1 but may drop to less than 0.1 for a radiused or angled inlet opening (as shown in FIGS. 17B and 17C) having a ratio of entry radius to hydraulic diameter greater than 0.2.

The requirement for the entry shape is dependent on an optimum between the cost of providing forced flow through the duct 100, the velocity of the air through the passage 104 of each duct 100 and the additional cost of providing the specific shape.

Figure 18A:
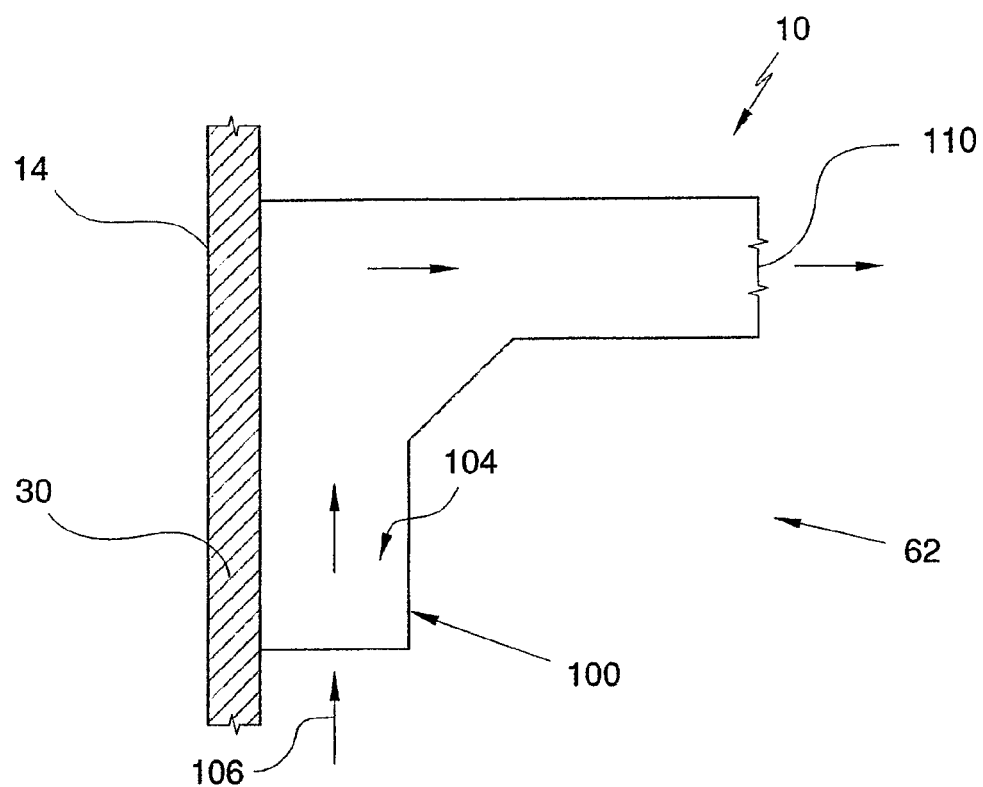
FIGS. 18A and B show variations of exit openings of the part of the heat transfer arrangement of FIG. 15.
Figure 18B:
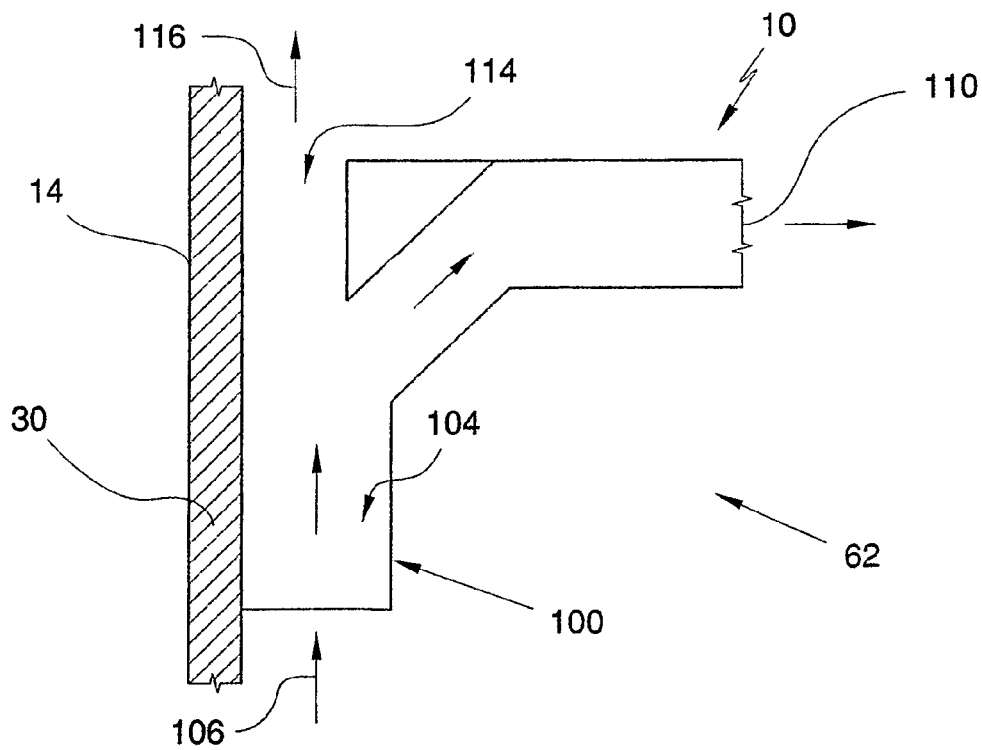
Figure 19:
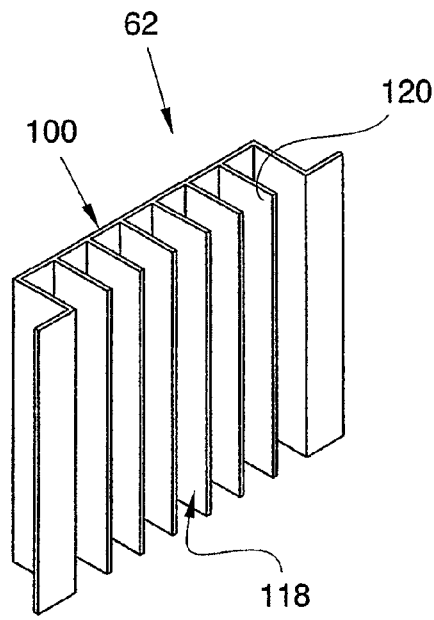
FIG. 19 shows a three dimensional, schematic view of a first variation of the part of the heat transfer arrangement of FIG. 15.
Figure 20:
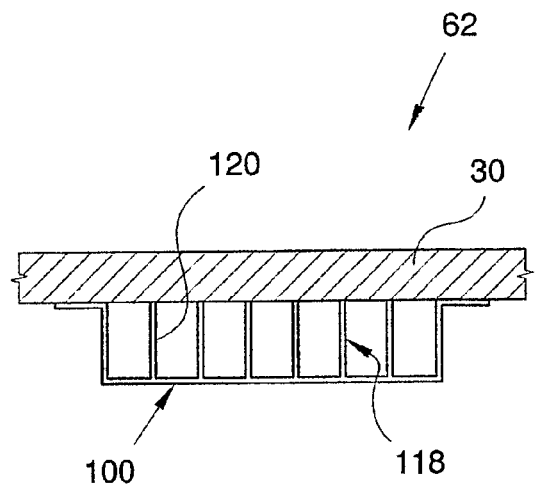
FIG. 20 shows a schematic, sectional plan view of the part of the heat transfer arrangement of FIG. 19.

A single exit opening 110 for each duct 100 may be provided as shown in FIG. 18A of the drawings for connection to the manifold 74 so that all the cooling air passes into the manifold 74. Instead, as shown in FIG. 18B of the drawings, a secondary exit opening 114 can be provided through which a part of the cooling air flows, as shown by arrow 116. This partial air flow 116 may be of assistance where, for some reason, the forced convective flow through the ducts 100 ceases for any reason. The air flow 116 maintains natural convective cooling of the wall 30 of the furnace 14. This should provide sufficient time to enable remedial action to be taken to reinstate the forced flow of air through the ducts 100 and to reduce the likelihood of significant damage to the wall 30 of the furnace 14 occurring.

If desired, the secondary exit opening 114 could be closed off by a pressure controlled flap (not shown) which, while there is forced flow of air through the duct 100 is held in a position closing off the secondary exit opening 114. Loss of pressure due to failure of the forced flow causes the flap to move to a position opening the secondary exit opening and allowing flow through the secondary exit opening 114.

A fully closed duct as shown in FIG. 18A has the advantage that all the heated air from the sections 62 is removed from surrounds of the furnace 14 including the operator working zone. This has the potential for reducing operator heat stress.

The partially open duct 100, as shown in FIG. 18B of the drawings, allows a portion of the heated air to pass into the branches and main conduit 12 to be removed from the local furnace environment. As described above, the remaining portion of the air flows, in the direction of the arrow 116, past the furnace wall 30 to maintain a measure of convective cooling of the furnace wall 30.

To enhance heat transfer between each section 62 and the furnace wall 30, each duct 100 contains heat transfer enhancing surfaces 118. In the variation illustrated in FIGS. 19 and 20 of the drawings, the heat transfer enhancing surfaces 118 are defined by fins 120 extending parallel to the direction of air flow through the passage 104 of each duct 100. These fins 120 do not create a significant pressure drop. The fins 120 act as heat sinks for accepting radiant and convective heat transfer from the furnace wall 30 and for transferring this heat to the cooling fluid passing through the spaces between adjacent fins 120. As with the duct 100, the fins 120 are treated to have high emissivity surfaces.

Figure 21:
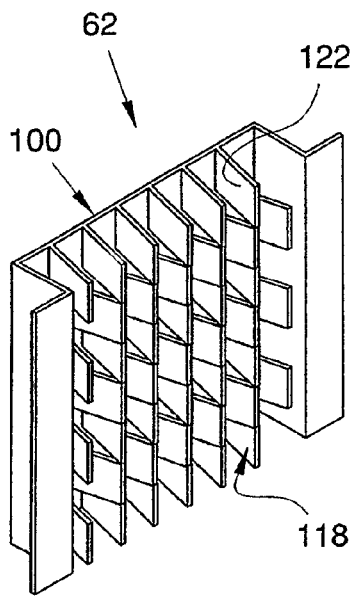
FIG. 21 shows a schematic, three dimensional view of a second variation of the part of the heat transfer arrangement of FIG. 15.
Figure 22:
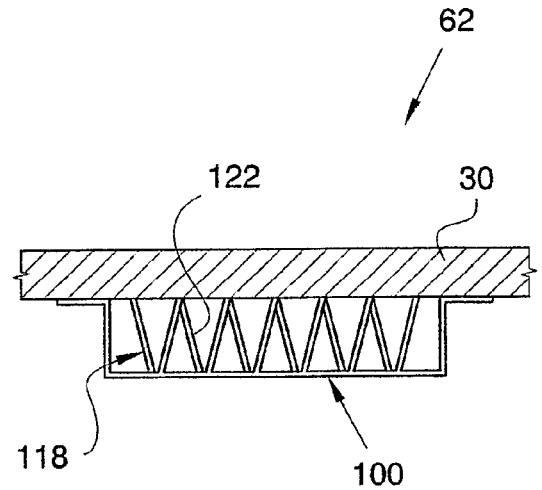
FIG. 22 shows a schematic, plan view of the part of the heat transfer arrangement of FIG. 21.

In the variation shown in FIGS. 21 and 22 of the drawings, instead of planar fins 120, each fin is slotted to provide short length fins 122 which are off set with respect to each other to form substantially V-shaped structures arranged in a staggered array of short lengths as shown in FIGS. 21 and 22 of the drawings.

This arrangement assists in reducing thermal boundary layers and, in so doing, enhancing convective heat transfer.

Figure 23:
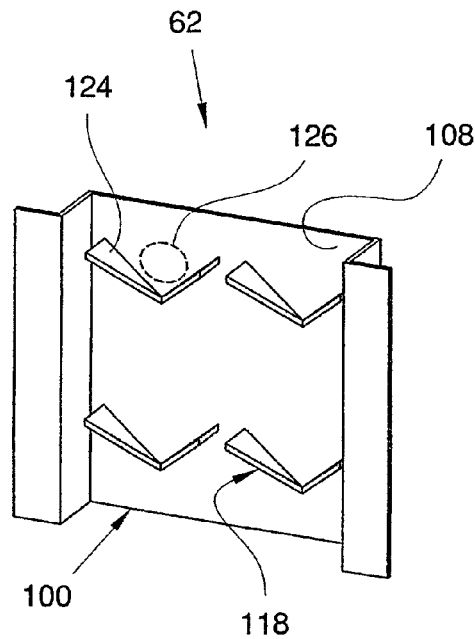
FIG. 23 shows a schematic, three dimensional view of a third variation of the part of the heat transfer arrangement of FIG. 15.
Figure 24:
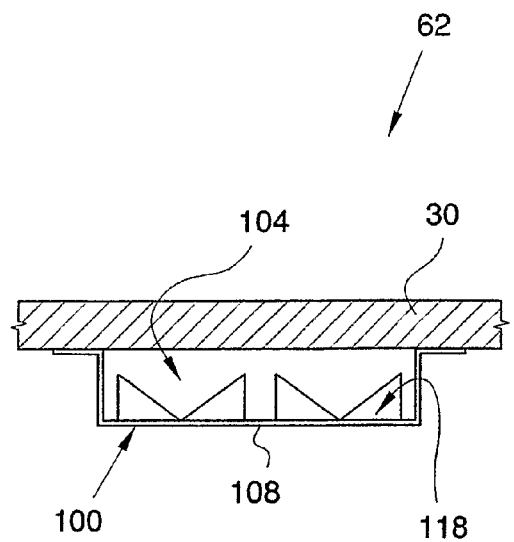
FIG. 24 shows a schematic, sectional plan view of the part of the heat transfer arrangement of FIG. 23.

In FIGS. 23 and 24 of the drawings, the heat transfer enhancing surfaces 118 comprise vortex generators 124 secured to an inner surface of the wall 108 of each duct 100 to lie within the passage 104, in use. The vortex generators 124 impede fluid flow through the passage 104 and cause vortices to develop. These vortices, once again, reduce the build up of thermal boundary layers enhancing convective heat transfer. As a further enhancement, orifices can be cut into the wall 108 of each duct 100, as shown schematically at 126 in FIG. 23 of the drawings. These orifices 126 draw cooler fluid into the passage 104 of the section 62 further to enhance heat transfer.

Figure 25:
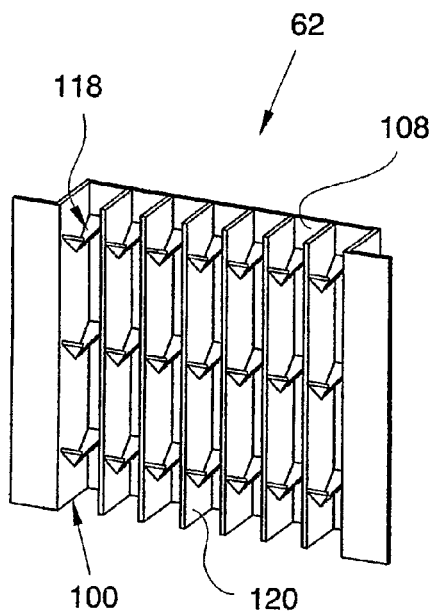
FIG. 25 shows a schematic, three dimensional view of a fourth variation of the art of the heat transfer arrangement of FIG. 15.
Figure 26:
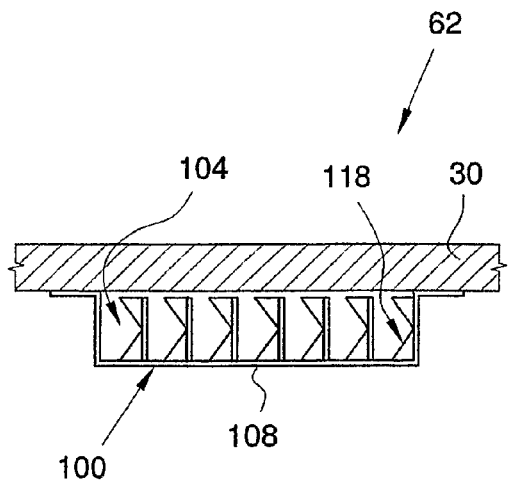
FIG. 26 shows a schematic, sectional plan view of the part of the heat transfer arrangement of FIG. 25.

Yet a further variation of the heat transferring surfaces 118 is shown in FIGS. 25 and 26 of the drawings. In this variation, the vortex generators 124 are arranged at vertically spaced intervals on the fins 120. The vortex generators 124 assist in transferring heat from the fins 120 to the cooling fluid and serve to maintain the fins 120 at a lower temperature. This allows both radiant heat transfer from the furnace wall 30 to occur as well as convective heat transfer from the heat transfer enhancing surfaces 118 to the cooling fluid flowing through the passage 104.

In the variation shown in FIGS. 27 and 28 of the drawings, the heat transfer enhancing surfaces are defined by corrugated fins 128. In addition, the fins 128 are perforated. The fins 128 are so arranged to form alternating wider and narrower passages between adjacent fins 128. The cooling fluid moves through these alternating wider and narrower sections creating localised pressure differentials which promote fluid flow through the perforated fins 128.

The combination of the extended surfaces defined by the fins 128, the alternating narrower and wider sections which reduce thermal boundary layers and fluid flow through the perforations of the fins 128 all enhance heat transfer.

The section 62 shown in FIGS. 29 and 30 of the drawings is a variation of the section 62 described above with reference to FIGS. 10 and 11 of the drawings and could also apply to the embodiments shown in FIGS. 12 to 14 of the drawings.

In this variation, each tube 72 has a slit 130 defined in the narrower wall of the tube 72 closer to the furnace wall 30. The slit 130 extends longitudinally.

A pressure differential is created across the tube 72 to encourage fluid flow in the direction of arrows 132 (FIG. 30). The cooling fluid impinges on the external surface of the wall 30 of the furnace 14 and is drawn into the slits 130 of the tubes 72 of each section 62. This cooling fluid is then, as described above with reference to FIGS. 10 and 11, fed through the manifold 74, into the conduit 12 for extraction. The fluid impinging on the furnace wall 30 reduces thermal boundary layers which enhances heat transfer. Heat transfer is also enhanced by the supply of cooler fluid external to the heat exchanger sections 62. This fluid flow is in addition to the fluid flow through the tubes 72 in the direction of the longitudinal axis of the tube 72 as described above with reference to FIGS. 10 and 11.

While this variation has been described with reference to a longitudinally extending slit, the slits can either be the full length of the tube 72 or of short lengths along the length of the tube 72. Another variation would be the use of a plurality of short tubes each defining a slit 130 with the tubes being arranged in horizontally and vertically spaced relationship to cover the furnace wall 30. This arrangement would be similar to that described above with reference to FIGS. 12 to 14 of the drawings.

An advantage of the second embodiment of the invention is the use of natural convective flow outside of the heat exchanger tubes 72. As indicated above, should forced convective flow in the passage 16 stop for any reason, the natural convective flow will, the Applicant believes, reduce the temperature rise of the wall 30 of the furnace 14 enabling remedial action to be taken with the likelihood of damage to the furnace due to overheating being reduced.

It is a particular advantage of the invention that a heat exchanger 10 is provided which uses a single heat exchange fluid. Heat exchange between the heat exchanger 10 and the furnaces 14 occurs both convectively and radiantly to enhance heat transfer.

A further major advantage of the invention is that a heat exchanger 10 is provided which can be mounted in situ without the need for any modification of the furnaces 14. Thus, the heat exchanger 10 can be mounted in position relative to the furnaces 14 without shutting down the furnaces 14. Thus, down time of the furnaces 14 is reduced, if not altogether eliminated, which has major economic benefits.

In addition, the provision of the heat exchanger 10 in lengths or sections facilitates the installation of the heat exchanger 10. No significant modification of the smelter is required apart from, where applicable, the installation of a fan system for the heat exchanger 10, which may optionally include a connection of the exit end of the conduit 12 to the extractor fan of the smelter.

In regard to the embodiment of the invention illustrated in FIGS. 5, 6 and 7-30 of the drawings, it is yet a further advantage of the invention that heat loading on operators in the smelter is reduced as heat is drawn through the conduit 12 and exits remote from the working zone of the operators.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A smelting furnace heat exchanger which includes:
   a conduit for conveying cooling fluid relative to a furnace to be cooled; and
   a heat transfer arrangement in communication with an interior of the conduit, the heat transfer arrangement and the conduit together defining an assembly that is mountable adjacent to, and externally of, the furnace to be cooled, convective heat exchange occurring, in use, due to movement of the cooling fluid relative to the furnace and to the heat transfer arrangement of the assembly and radiant heat exchange occurring between the furnace and at least part of the heat transfer arrangement of the assembly, the heat transfer arrangement further comprising heat transfer enhancing parts and in which the heat transfer enhancing parts of the heat transfer arrangement comprises a plurality of fins arranged on an outer surface of the conduit.

2. A smelting furnace heat exchanger which includes:
   a conduit for conveying cooling fluid relative to a furnace to be cooled; and
   a heat transfer arrangement in communication with an interior of the conduit, the heat transfer arrangement and the conduit together defining an assembly that is mountable adjacent to, and externally of, the furnace to be cooled, convective heat exchange occurring, in use, due to movement of the cooling fluid relative to the furnace and to the heat transfer arrangement of the assembly and radiant heat exchange occurring between the furnace and at least part of the heat transfer arrangement of the assembly, the heat transfer arrangement further comprising heat transfer enhancing parts, the assembly being formed in sections which can be arranged in end-to-end relationship with the conduit forming a passage through which the cooling fluid flows and in which each section of the assembly is mounted on rollers.

3. The heat exchanger of claim 1 in which at least the heat transfer arrangement is of a heat absorption material.

4. The heat exchanger of claim 1 in which an operatively inner region of the conduit contains heat exchange elements.

5. The heat exchanger of claim 4 in which the heat exchange elements are in the form of heat transfer media to effect increased convective heat exchange between the conduit and the cooling fluid within the conduit.

6. The heat exchanger of claim 1 in which control of fluid flow through the conduit is effected by means of control elements arranged in the conduit.

7. The heat exchanger of claim 1 which includes a deflector arranged, in use, operatively below the assembly for deflecting the cooling fluid into contact with the furnace to be cooled.

8. The heat exchanger of claim 1 which includes a fluid entrapment element arranged operatively above the conduit for inhibiting escape or by-passing of heated air.

9. The heat exchanger of claim 1 in which a downstream end of the conduit is connected to a fluid extraction arrangement.

10. The heat exchanger of claim 1 in which a heat absorbing accessory is mounted to the conduit.

11. The heat exchanger of claims 1 in which the heat transfer arrangement comprises a plurality of spaced ducts, connected by a manifold, to the conduit, the ducts being arranged at spaced intervals along each manifold.

12. The heat exchanger of claim 11 in which each duct is in the form of a substantially channel-shaped section which, in use, is positioned adjacent a wall of the furnace to form a passage through which the cooling fluid can pass.

13. The heat exchanger of claim 11 in which an entry opening of each duct is shaped to reduce a pressure drop associated with entry of the cooling fluid into the duct.

14. The heat exchanger of claims 11 in which the duct connects to the manifold via an exit opening.

15. A smelting furnace heat exchanger which includes:
a conduit for conveying cooling fluid relative to a furnace to be cooled; and
a heat transfer arrangement in communication with an interior of the conduit, the heat transfer arrangement and the conduit together defining an assembly that is mountable adjacent to, and externally of, the furnace to be cooled, convective heat exchange occurring, in use, due to movement of the cooling fluid relative to the furnace and to the heat transfer arrangement of the assembly and radiant heat exchange occurring between the furnace and at least part of the heat transfer arrangement of the assembly, the heat transfer arrangement comprising a plurality of spaced ducts, connected by a manifold, to the conduit, the ducts each containing heat transfer enhancing parts and the ducts being arranged at spaced intervals along each manifold, each duct connecting to the manifold via an exit opening and
in which each duct defines a secondary exit opening to allow escape of some of the cooling fluid to atmosphere to provide natural convective flow when no assisted flow is present.

16. The heat exchanger of claim 15 in which each duct is in the form of a tube to be arranged adjacent the wall of the furnace to be cooled.

17. The heat exchanger of claim 16 in which each tube is substantially rectangular in cross-section having a high depth to width aspect ratio.

18. A smelting furnace heat exchanger which includes:
a conduit for conveying cooling fluid relative to a furnace to be cooled; and
a heat transfer arrangement in communication with an interior of the conduit, the heat transfer arrangement and the conduit together defining an assembly that is mountable adjacent to, and externally of, the furnace to be cooled, convective heat exchange occurring, in use, due to movement of the cooling fluid relative to the furnace and to the heat transfer arrangement of the assembly and radiant heat exchange occurring between the furnace and at least part of the heat transfer arrangement of the assembly, the heat transfer arrangement comprising a plurality of spaced ducts, connected by a manifold, to the conduit, the ducts each containing heat transfer enhancing parts and the ducts being arranged at spaced intervals along each manifold, each duct being in the form of a tube to be arranged adjacent the wall of the furnace to be cooled and
a part of each tube in proximity to the furnace defining at least one aperture to enhance heat transfer between the tube and the furnace due to reduced thermal boundary layers.

19. A smelting furnace heat exchanger which includes:
a conduit for conveying cooling fluid relative to a furnace to be cooled;
a heat transfer arrangement in communication with an interior of the conduit, the heat transfer arrangement and the conduit together defining an assembly that is mountable adjacent to, and externally of, the furnace to be cooled, convective heat exchange occurring, in use, due to movement of the cooling fluid relative to the furnace and to the heat transfer arrangement of the assembly and radiant heat exchange occurring between the furnace and at least part of the heat transfer arrangement of the assembly, the heat transfer arrangement comprising a plurality of spaced ducts, connected by a manifold, to the conduit, the ducts each containing heat transfer enhancing parts and the ducts being arranged at spaced intervals along each manifold; and
a shielding element for shielding those parts of a structure in which the furnace to be cooled is located, arranged on an opposite side of the shielding element from the furnace, from radiation heat transfer from the furnace.

20. The heat exchanger of claim 19 in which the shielding element is in the form of a shield plate which, together with the wall of the furnace, defines a channel through which the cooling fluid can pass to aid in natural convective heat transfer from the wall of the furnace to those parts of the heat transfer arrangement arranged within the channel.

21. The heat exchanger of claim 20 in which a rising part of each duct is arranged in the channel so that heat transfer from the furnace to the tubes occurs both by radiation and by convection.

22. The heat exchanger of claim 21 in which each duct has a vertical section entering its manifold via a cranked downstream region of the duct.

23. The heat exchanger of claim 21 in which each duct has a horizontal upstream portion leading to a vertical portion arranged between the shielding plate and the furnace.

24. The heat exchanger of claim 23 in which each section of the heat transfer arrangement comprises a plurality of units, each unit comprising a manifold with its associated ducts, with the manifolds being vertically stacked and the ducts of an upper unit being interleaved with the ducts of a subjacent unit providing lengths of vertical portions of the ducts facing the wall of the furnace to enhance heat transfer.

25. The heat exchanger of claims 11 in which the heat transfer enhancing parts are in the form of surface area increasing components carried in an interior of each duct to enhance at least one of convective heat transfer rates and radiant heat transfer rates.

26. The heat exchanger of claim 25 in which the components are selected from the group consisting of fins, vortex inducing elements and combinations of the foregoing.

27. The heat exchanger of claim 25 in which the components include foraminous elements.

28. A method of cooling a smelting furnace which includes:
mounting a heat transfer arrangement of a heat exchanger assembly, the assembly including a conduit in proximity to, and externally of, the furnace so that radiant heat exchange between the smelting furnace and at least a part of the heat transfer arrangement occurs; and
directing cooling fluid past the furnace, into contact with the heat transfer arrangement and into the conduit so that convective heat exchange between the fluid, the furnace and the heat transfer arrangement occurs, the heat transfer arrangement comprising heat transfer enhancing parts for enhancing at least one of radiant heat exchange and convective heat exchange and in which the heat transfer enhancing parts of the heat transfer arrangement comprise a plurality of fins arranged on an outer surface of the conduit and the method includes passing the fluid through spaces between adjacent fins, the spaces serving as radiant heat traps to assist in radiant heat transfer between the furnace and the assembly.

29. The method of claim 28 which includes assisting convective flow of the fluid through the heat transfer arrangement and the conduit.

30. The method of claim 29 which includes effecting the assistance by creating a low pressure region in a passage of the conduit.

31. The method of claim 30 which includes forming the heat exchanger assembly in sections and arranging the sections in end-to-end relationship with the conduit forming the passage through which the fluid flows.

32. The method of claims 28 which includes controlling fluid flow through the conduit.

33. The method of claim 28 which includes mounting the assembly between a plurality of furnaces to be cooled and deflecting fluid into contact with walls of the furnaces and drawing the fluid into the interior of the conduit through apertures defined intermediate the fins in walls of the conduit.

34. The method of claim 28 which includes arranging a fluid entrapment element operatively above the conduit for inhibiting escape or by-passing of heated air.

35. The method of claims 28 which includes connecting a downstream end of the conduit to a fluid extraction arrangement.

36. The method of claim 28 which includes positioning the conduit in proximity to a floor of a structure in which the furnace is contained.

37. The method of claim 36 which includes mounting a heat absorbing accessory to the conduit.

38. The method of claims 28 which includes mounting a plurality of ducts of the heat transfer arrangement at spaced intervals along the furnace, adjacent a wall of the furnace, and connecting a plurality of the ducts to the conduit by at least one manifold.

39. The method of claim 38 which includes shaping an entry opening of each duct to reduce a pressure drop associated with entry of cooling fluid into the duct.

40. The method of claim 38 which includes connecting an exit opening of the duct to the manifold.

41. A method of cooling a smelting furnace which includes:
mounting a heat transfer arrangement of a heat exchanger assembly, the assembly including a conduit, in proximity to, and externally of, the furnace by mounting a plurality of ducts of the heat transfer arrangement at spaced intervals along the furnace, adjacent a wall of the furnace, and connecting a plurality of the ducts to the conduit by at least one manifold and connecting an exit opening of each duct to the manifold so that radiant heat exchange between the smelting furnace and at least a part of the heat transfer arrangement occurs;
directing cooling fluid past the furnace, into contact with the heat transfer arrangement and into the conduit so that convective heat exchange between the fluid, the furnace and the heat transfer arrangement occurs, the heat transfer arrangement comprising heat transfer enhancing parts for enhancing at least one of radiant heat exchange and convective heat exchange; and
providing natural convective flow when no assisted flow is present by allowing escape of some of the cooling fluid to atmosphere through a secondary exit opening defined in each duct.

42. A method of cooling a smelting furnace which includes:
mounting a heat transfer arrangement of a heat exchanger assembly, the assembly including a conduit, in proximity to, and externally of, the furnace by mounting a plurality of ducts of the heat transfer arrangement at spaced intervals along the furnace, adjacent a wall of the furnace, and connecting a plurality of the ducts to the conduit by at least one manifold and connecting an exit opening of each duct to the manifold so that radiant heat exchange between the smelting furnace and at least a part of the heat transfer arrangement occurs;
directing cooling fluid past the furnace, into contact with the heat transfer arrangement and into the conduit so that convective heat exchange between the fluid, the furnace and the heat transfer arrangement occurs, the heat transfer arrangement comprising heat transfer enhancing parts for enhancing at least one of radiant heat exchange and convective heat exchange; and
enhancing heat transfer between the duct, which is in the form of a tube, and the furnace by passing the fluid through an aperture defined in a wall of the tube.

43. A method of cooling a smelting furnace which includes:
mounting a heat transfer arrangement of a heat exchanger assembly, the assembly including a conduit, in proximity to, and externally of, the furnace by mounting a plurality of ducts of the heat transfer arrangement at spaced intervals along the furnace, adjacent a wall of the furnace, and connecting a plurality of the ducts to the conduit by at least one manifold and connecting an exit opening of each duct to the manifold so that radiant heat exchange between the smelting furnace and at least a part of the heat transfer arrangement occurs;
directing cooling fluid past the furnace, into contact with the heat transfer arrangement and into the conduit so that convective heat exchange between the fluid, the furnace and the heat transfer arrangement occurs, the heat transfer arrangement comprising heat transfer enhancing parts for enhancing at least one of radiant heat exchange and convective heat exchange; and
mounting a shielding element in spaced relationship relative to a wall of the furnace for shielding those parts of a structure in which the furnace to be cooled is located, arranged on an opposite side of the shielding element from the furnace, from radiation heat transfer from the furnace.

44. The method of claim 43 which includes passing the fluid through a channel defined between the shielding element and the wall of the furnace to aid in natural convective heat transfer from the wall of the furnace to those parts of the heat transfer arrangement arranged within the channel.

45. The method of claim 44 which includes arranging a rising part of each duct in the channel so that heat transfer from the furnace to the ducts occurs both by radiation and by convection.

46. The method of claim 38 which includes enhancing at least one of convective heat transfer and radiant heat transfer by passing the fluid over surface increasing components arranged in an interior of each.

47. The heat exchanger of claim 1 in which the cooling fluid is air.

48. A method of cooling a smelting furnace which includes:

mounting a heat transfer arrangement of a heat exchanger assembly, the assembly including a conduit in proximity to, and externally of, the furnace so that radiant heat exchange between the smelting furnace and at least a part of the heat transfer arrangement occurs;

directing cooling fluid past the furnace, into contact with the heat transfer arrangement and into the conduit so that convective heat exchange between the fluid, the furnace and the heat transfer arrangement occurs, the heat transfer arrangement comprising heat transfer enhancing parts for enhancing at least one of radiant heat exchange and convective heat exchange; and using air as the cooling fluid.

49. The method of claim 48 in which the heat transfer enhancing parts increase the surface area available for enhancing convective heat transfer between the air and the heat transfer arrangement.

50. The method of claim 48 in which the heat transfer enhancing parts include vortex inducing components carried on an interior of the heat transfer arrangement for enhancing convective heat transfer between the air and the heat transfer arrangement.

* * * * *